US012692721B2

(12) United States Patent
Gamble et al.

(10) Patent No.: US 12,692,721 B2
(45) Date of Patent: Jul. 28, 2026

(54) HANDS-FREE LOCKING MECHANISM

(71) Applicant: SmartStall, Inc., Atlanta, GA (US)

(72) Inventors: Wynn Woodall Gamble, Atlanta, GA (US); Chase Maasdorp, Atlanta, GA (US)

(73) Assignee: SmartStall, Inc., Atlanta, GA (US)

(*) Notice: Subject to any disclaimer, the term of this patent is extended or adjusted under 35 U.S.C. 154(b) by 3 days.

(21) Appl. No.: 18/682,427

(22) PCT Filed: Aug. 9, 2022

(86) PCT No.: PCT/US2022/074725
§ 371 (c)(1),
(2) Date: Feb. 8, 2024

(87) PCT Pub. No.: WO2023/019149
PCT Pub. Date: Feb. 16, 2023

(65) Prior Publication Data

US 2024/0344358 A1 Oct. 17, 2024

Related U.S. Application Data

(60) Provisional application No. 63/267,375, filed on Jan. 31, 2022, provisional application No. 63/231,085, filed on Aug. 9, 2021.

(51) Int. Cl.
*E05B 47/00* (2006.01)
*E05B 17/10* (2006.01)
*E05B 41/00* (2006.01)

(52) U.S. Cl.
CPC .......... *E05B 47/0001* (2013.01); *E05B 17/10* (2013.01); *E05B 41/00* (2013.01);
(Continued)

(58) Field of Classification Search
CPC ...... E05B 47/00; E05B 47/0001; E05B 17/10; E05B 41/00; E05B 2047/0058; E05B 2047/0067; Y10T 70/7028; Y10T 70/7107
(Continued)

(56) References Cited

U.S. PATENT DOCUMENTS 5,265,452 A 11/1993 Dawson et al.
5,729,198 A 3/1998 Gorman
(Continued)

FOREIGN PATENT DOCUMENTS

CN 106639816 A 5/2017
CN 108868348 A 11/2018
(Continued)

OTHER PUBLICATIONS

AU2022328321, "First Examination Report", Aug. 20, 2025, 4 pages.
(Continued)

*Primary Examiner* — Suzanne L Barrett
(74) *Attorney, Agent, or Firm* — Kilpatrick Townsend & Stockton LLP

(57) ABSTRACT

A hands-free locking mechanism includes a locking component and a latching component. The locking component comprises a protruding element, a sensor, a controller and a motor. The protruding element comprises a spring configured to allow elastic movement of the protruding element into and out of the locking component. The elastic movement allows the locking mechanism to enter an unlocked and closed state when the protruding element is brought into contact with the latching component. When in the unlocked and closed state, the sensor senses user action and the controller causes the motor to extend the protruding element into an opening of the latching component, placing the locking mechanism into a locked and closed state. When in
(Continued)

the locked and closed state, the sensor senses further user action and the controller causes the motor to retract the protruding element, placing the locking mechanism into an unlocked and open state.

19 Claims, 19 Drawing Sheets

(52) U.S. Cl.
CPC ................. *E05B 2047/0058* (2013.01); *E05B 2047/0067* (2013.01)

(58) Field of Classification Search
USPC .......................................................... 70/279.1
See application file for complete search history.

(56) References Cited

U.S. PATENT DOCUMENTS

| | | | |
|---|---|---|---|
| 5,881,589 | A | 3/1999 | Clark et al. |
| 7,068,179 | B2 | 6/2006 | Snell et al. |
| 8,141,296 | B2 | 3/2012 | Bem |
| 8,169,317 | B2 | 5/2012 | Lemerand et al. |
| 8,284,018 | B2 | 10/2012 | Ibsies |
| 9,217,272 | B2 | 12/2015 | Phillips |
| 9,394,732 | B1 | 7/2016 | Ahmad |
| 9,447,625 | B1 | 9/2016 | Seebaransingh et al. |
| 10,017,968 | B2 | 7/2018 | Seibt et al. |
| 10,049,516 | B2 | 8/2018 | Padgett et al. |
| 10,081,968 | B2 | 9/2018 | Klevens et al. |
| 10,612,289 | B2 | 4/2020 | Ibsies |
| 10,697,203 | B1 | 6/2020 | Gokcebay |
| 2015/0330120 | A1 | 11/2015 | Hogan et al. |
| 2021/0317697 | A1 * | 10/2021 | Tulsidas ................. G06V 40/40 |
| 2022/0042365 | A1 | 2/2022 | Sripathi et al. |

FOREIGN PATENT DOCUMENTS

| | | | | | |
|---|---|---|---|---|---|
| EP | 2450509 | A2 | | 5/2012 | |
| EP | 2570574 | B1 | | 9/2014 | |
| EP | 3517714 | A1 | | 7/2019 | |
| EP | 3919707 | A1 | | 12/2021 | |
| GB | 2589403 | A | | 6/2021 | |
| JP | 2011007036 | A | * | 1/2011 | ......... G07C 9/00944 |
| WO | 2021211071 | A1 | | 10/2021 | |
| WO | 2021255732 | | | 12/2021 | |
| WO | 2022012858 | A1 | | 1/2022 | |
| WO | 2022020893 | A1 | | 2/2022 | |

OTHER PUBLICATIONS

CA3228176, “Office Action”, Feb. 28, 2025, 3 pages.
PCT/US2022/074725, “International Preliminary Report on Patentability”, Feb. 22, 2024, 11 pages.
PCT/US2022/074725 , “International Search Report and the Written Opinion”, Nov. 25, 2022, 13 pages.
CA3228176. “Office Action”, Feb. 4, 2026, 4 pages.

* cited by examiner

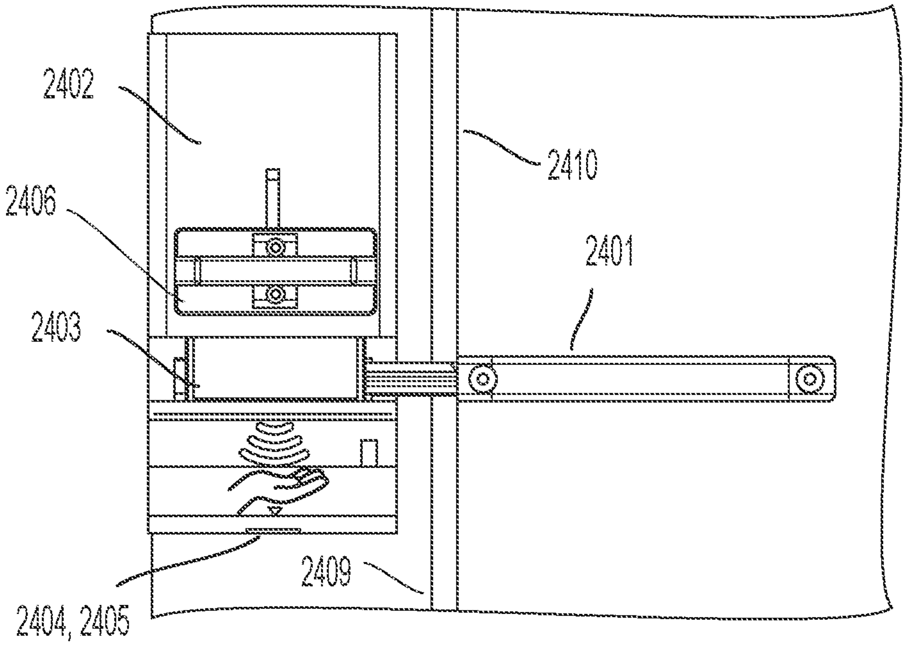
FIG. 25
FIG. 26B
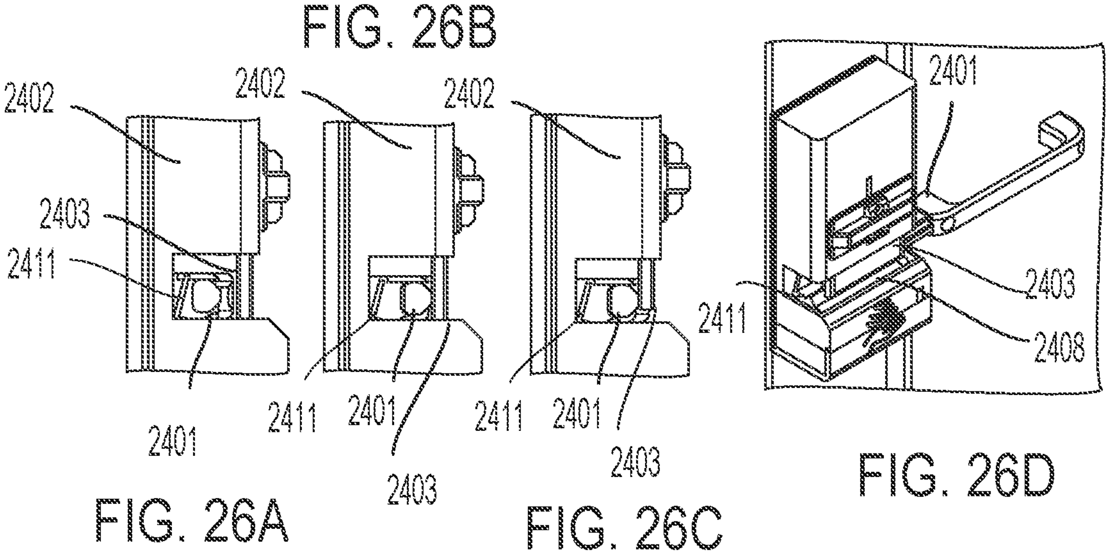
FIG. 26A
FIG. 26C
FIG. 26D

HANDS-FREE LOCKING MECHANISM

CROSS-REFERENCES TO RELATED APPLICATIONS

The present application claims priority to U.S. Provisional Application Ser. No. 63/231,085 filed on Aug. 9, 2021, and U.S. Provisional Application Ser. No. 63/267,375 filed on Jan. 31, 2022. The entire contents of each are hereby incorporated by reference in their entirety for all purposes.

TECHNICAL FIELD

This disclosure relates generally to a hands-free locking mechanism capable of being triggered when a sensor detects user action.

BACKGROUND

Bathroom stall locking mechanisms (hereafter stall latches) are among the dirtiest surfaces in a restroom. Stall latches are touched by most people using a public restroom. Stall latches are also contaminated by the stall latches' proximity to flushing toilets. Infections may be transmitted by unclean hands contacting contaminated surfaces. Also, when toilets are flushed, the toilet releases microscopic fecal matter and vapor that may contaminate the stall latch and other surfaces in the restroom.

Unsanitary stall latches are different from other surfaces in the restroom because users generally do not take the time to wash their hands prior to touching stall latches, i.e., prior to entering a stall. In addition, most public restrooms do not provide a means to wash the user's hands within a stall. Thus, a continuing need exists to reduce spreading of contaminants from stall latches by a device which allows for hands-free locking and unlocking of stalls.

SUMMARY

The present disclosure seeks to address the above issues by way of a hands-free locking mechanism that uses at least one sensor to trigger a motor response. The motor adjusts an extendable and retractable element, such as a bolt or other element, to lock or unlock the mechanism. Installation of the locking mechanism on a bathroom stall allows for users to avoid the germs that would otherwise be transferred to their hands from touching a bathroom stall latch. The locking mechanism may comprise a locking component and a complementary latching component. The locking component may be mounted on a door and the latching component may be mounted on a door frame. The locking component may comprise a sensor, controller, and a motor. The sensor may sense user action and may be configured to communicate information to the controller. The controller may be configured to control the motor, wherein the motor may extend and retract the element into and out of an opening of the latching component. Extending the element into the opening locks the locking mechanism and retracting the element from the opening unlocks the locking mechanism. In other examples, the latching component comprises a fixed latch or bolt that may be moved into and secured within an opening of the locking component to lock the locking mechanism. In other examples, the latching component may be mounted on the stall door and the locking component may be mounted on the door frame.

BRIEF DESCRIPTION OF THE FIGURES

These and other features, aspects, and advantages of the present disclosure are better understood when the following Detailed Description is read with reference to the accompanying drawings.

FIG. 25 depicts an exemplary locking mechanism in a locked state, in accordance with various embodiments of the present disclosure.

FIGS. 26A, 26B, 26C, and 26D depict an exemplary locking mechanism transitioning between a locked state and an unlocked state, in accordance with various embodiments of the present disclosure.

DETAILED DESCRIPTION

Figure 1A:
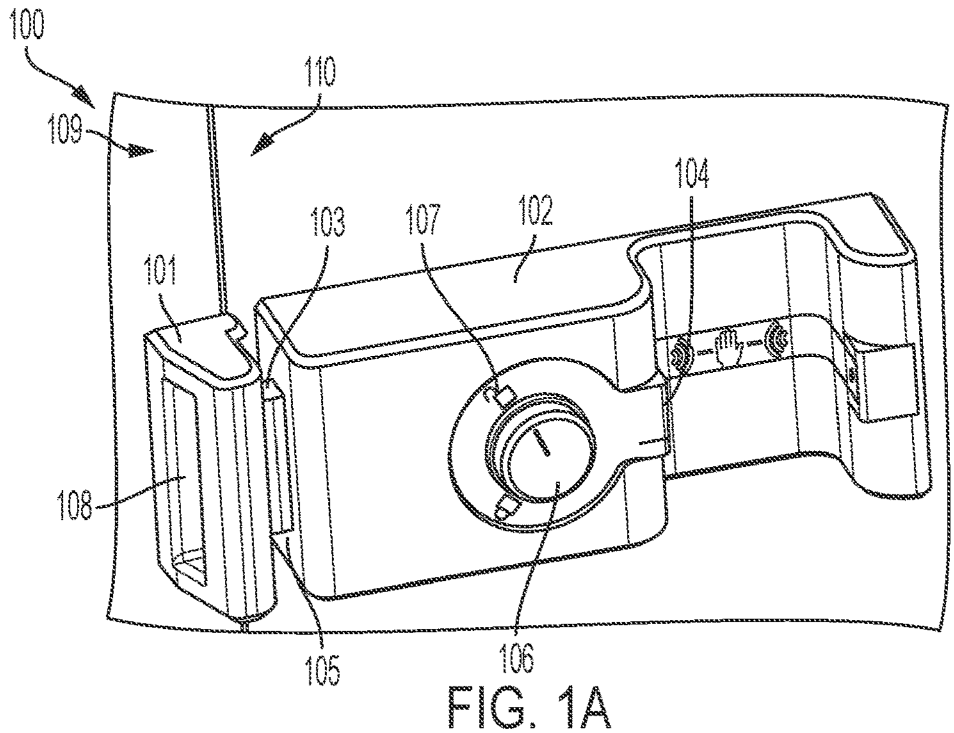
FIG. 1A depicts an exemplary locking mechanism, in accordance with various embodiments of the present disclosure.

Disclosed solutions include various embodiments of a locking mechanism that allows for hands-free locking and unlocking of bathroom stalls or similar structures. The locking mechanism can be mounted in part on a door and in part on the complementary fixed door frame on the latching side of the door and door frame. The present invention allows users to avoid touching the locking mechanism for the bathroom stall door with their hands. The locking mechanism of the invention includes one or more sensors which may detect the proximity and/or motion of a user's actions. For example, when user motion is detected by a motion sensor, the sensor triggers a response from a motor, which adjusts a state of the locking mechanism, i.e., locking or unlocking the locking mechanism.

The locking mechanism includes a locking component and a complementary latching component. In some embodiments, the locking component may include an extendable and retractable bolt or other protruding element. A motor within the locking component may be triggered by a sensor to drive the protruding element into and out of an opening in the latching component. To utilize the sensor, the user may move a preferred appendage, e.g., a hand, or another object within range of the sensor.

In other embodiments, the latching component comprises a fixed bolt or other latch element and the locking component includes an opening configured to receive the latch element. In such embodiments, the locking component includes a motor that may be triggered by a sensor to drive a protruding element that secures the latch element within the opening of the locking component. A second triggering of the sensor causes the protruding element to be retracted into the locking component thereby freeing the latch element to move out of the opening, thereby unlocking the door.

In certain embodiments, the door (or any similar structure that is meant to be opened and closed) may have a fixture embedded within or attached to it that causes the structure to swing to the open position when unlocked. This may include but is not limited to an external fixture such as spring hinges or gravity hinges that pairs with the locking mechanism. In other embodiments the door or other structure that is meant to be open and closed may have a fixture embedded within or attached to it that, upon activation, causes the door or other structure to swing into the closed position. Then, upon unlocking the locking mechanism, the door or similar structure may automatically swing to the open position.

In various embodiments, the locking mechanism may include one or more sensors, such as motion and/or proximity sensors. The sensors may be one or more of inductive, optical, capacitive, magnetic, or ultrasonic sensors. Other sensing technologies are known in the art and/or may hereinafter be developed and may alternatively or additionally be used with the locking mechanism in certain embodiments. The sensor(s) may be programmed to trigger when certain parameters are met. These parameters may include temperature range of a triggering object, frequency of movement of the triggering object, and time that triggering object remains in sensing range. The invention is not limited to the aforementioned parameters of the sensors though.

In some embodiments, the described locking mechanism, or at least certain components thereof, can be created via manufacturing methods including but not limited to computer numerical control machining, injection molding, additive manufacturing, and hand assembly.

Exemplary Locking Mechanisms

FIG. 1A depicts a locking mechanism 100 according to certain embodiments of the present invention. The locking mechanism 100 may include a latching component 101 mounted to a door frame 109 and a locking component 102 mounted to a complementary door 110. The latching component 101 geometry and mounting position may vary based on the direction the door 110 swings during proper operation, as seen in the illustrative embodiments of FIG. 1A (out-swinging door) and FIG. 2A (in-swinging door). In FIG. 1A, the latching component 101 is mounted to the edge of the inside wall of the door frame 109, extending slightly beyond the edge of the door frame 109. The portion extending beyond the edge of the door frame 109 contacts the door 110 and thereby acts as a stop when the door 110 is closed, preventing the door from swinging into the interior of the stall. The locking component 102 is set-back slightly from the edge of the door 110 to accommodate the portion of the latching component 101 that extends beyond the edge of the door frame 109. The latching component 101 is configured to accommodate a protruding element 103, which protrudes or extends from the locking component 102. For example, the latching component 101 may include an opening 108 into which the protruding element 103 may extend to place the locking mechanism 100 into the locked position. The protruding element 103 may be, for example, a bolt or other latch element.

Other configurations for mating the latching component 101 and the protruding element 103 are possible. For example, the locking component 102 may be configured such that the protruding element 103 does not extend through an opening 108 in the latching component 101, but rather passes behind the latching component 101. In this configuration, the door 110 is secured in the closed position due to the portion of the latching component 101 that extends beyond the edge of the door frame 109 preventing the door from swinging into the stall and the protruding element 103 preventing the door 110 from opening outward from the stall.

The protruding element 103 may be extended and retracted by means of a motor located inside the locking component 102. One or more sensors 104, 105 may sense user action and other operating conditions of the locking mechanism 100. A sensor may be programmed to trigger when certain parameters are met. For example, sensor 104 may be a motion sensor to detect a user action. In some examples, sensor 104 may use break beam technology to detect a user. The sensor 204 may use any other suitable type of sensing technology, such as passive, infrared (PIR), ultrasonic Microwave, tomographic and hybrid sensing technologies.

In another example, the sensor 105 may be configured to recognize when the door 110 is in the open or closed position. For example, the sensor 105 may be a proximity sensor positioned on or within the locking component 102 and configured to sense when the locking component 102 is within proximity to the latching component 101, similar to the function of a reed switch in a security system connected to a door that communicates when the door is opened and closed. Alternatively, or additionally, a proximity sensor 105 may be positioned on or within the latching component 101.

In some embodiments, the locking mechanism 100 may be configured for hands-free and manual operation. A knob 106 may allow a user to manually, e.g., by physically grasping it, change the state of the locking mechanism 100 between locked and unlocked positions by applying force to move the position of the locking bolt. The state of the locking mechanism 100 may be communicated to the user by a state display 107 or any other suitable indicator. In some embodiments, the locking mechanism 100 may alternatively or additionally include a tab, button, or other means for allowing a user to manually adjust the state of the locking mechanism 100.

In some examples, the knob 106 may rotate when the protruding element 103 is extended or retracted from the locking component 102. The knob 106 may include markings, such as an arrow or a line, such that when the knob 106 rotates, the markings may indicate a state of the locking mechanism 100 based on an orientation of the markings.

In some examples, the protruding element 103 of the locking mechanism 100 may be given an elastic property by, but not limited to, compression springs, extension springs, torsion springs, Belleville springs, drawbar springs and/or other deformable structures capable of being elastically compressed and decompressed with minimal force, e.g., foam, rubber, soft plastic, thin metal, etc. In such embodiments, when the protruding element 103 engages the latching component 101, it may extend beyond the extended edge of the latching component and/or slightly into the opening 108 of the latching component 101, just enough to hold the locking component 102, and thus the door 110, in a closed position until a light force is applied to move the door 110 into an open position. This configuration may be referred to herein as the unlocked and closed position or the unlocked and closed state.

In some embodiments, the protruding element 103 automatically extends slightly into the opening 108 of the latching component due to the configuration of the above-mentioned springs or other deformable component. For example, in its resting state, the protruding element 103 may partially protrude from the locking component 102. When the out-swinging door is closed, the protruding element 103 passes by and contacts the portion of the latching component 101 that extends beyond the edge of the door frame 109, the protruding element 103 is temporarily pushed into the locking component 102. When clear of the portion of the latching element 101 that extends beyond the edge of the door frame 109, the protruding element 103 again extends out of the locking component 102 and slightly into the opening of the latching component 101.

In other embodiments, the elastic nature of the protruding element may be activated by way of a proximity sensor 105. For example, a proximity sensor 105 may be configured to sense when the locking component 102 is within proximity to the latching component 101 and to then release a spring or other mechanism that holds the protruding element 103 in its most retracted state. When released, the protruding element 103 may extend slightly into the opening of the latching component 101.

In other embodiments, a separate elastic component in the form of a button or tab like protrusion (not shown) may be embedded in, attached to, or otherwise operably connected to the protruding element 103 or to another part of the locking component 102. Such a separate elastic component may be configured to contact the latching component 101 or extend slightly into the opening 108 just enough to hold the door 110 in the unlocked and closed position.

When in the closed unlocked position, the locking component 102 may be activated to cause the protruding element 103 to more fully extend into the opening 108 of the latching component 101 to thereby securely lock the locking mechanism 100, and thus the door 110. This configuration may be referred to herein as the locked and closed position or locked and closed state. Again, the locking component 102 may be activated by a sensor 104 triggering a motor to further extend the protruding element 103.

When the locking component 102 is activated while in the locked and closed state (e.g., by triggering a sensor 104, 105), the protruding element 103 may be retracted into the locking component 102. In some embodiments, this action will return the locking mechanism 100 to the unlocked and closed state, in which the protruding element 103 continues to extend slightly into the opening 108 of the latching component and the door remains closed due to the elastic force. In other embodiments, activating the locking component 102 when the locking mechanism 101 is in the locked and closed state will cause the protruding element 103 to be fully retracted from the opening 108 of the latching component 102, allowing the door 110 to freely and/or automatically swing open, e.g., due to the nature of its hinges. This may be referred to herein as the unlocked and open position or unlocked and open state. In the unlocked and open position, the protruding element 103 may again extend beyond the edge of the locking component 102 due to its elastic property.

Figure 1B:
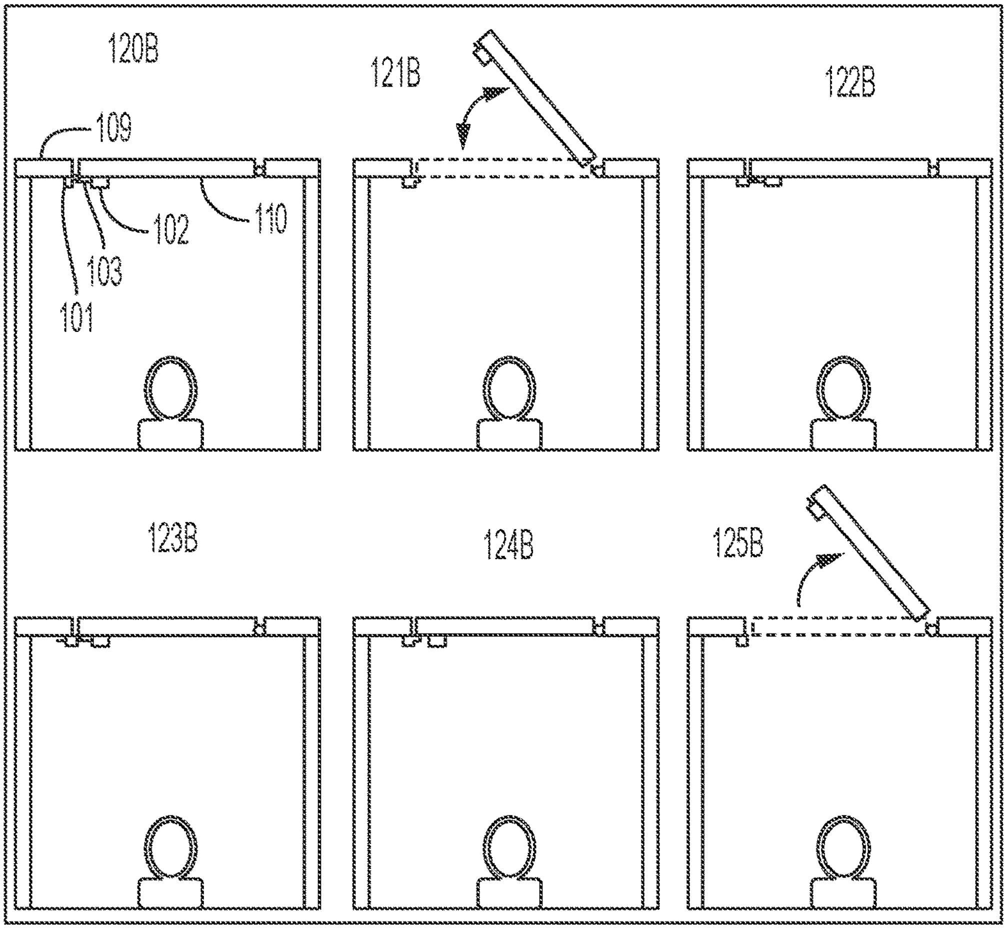
FIG. 1B depicts states of an exemplary locking mechanism and an outwardly swinging door, in accordance with various embodiments of the present disclosure.

FIG. 1B depicts the transitions between states of the exemplary locking mechanism 100 shown in FIG. 1A, as the outward-swinging door 110 is moved between closed and open positions. The locking component 102 is mounted on the door 110 and the latching component 101 is mounted on the door frame 109. At position 120B, the locking mechanism 100 is in an unlocked and closed state. The door 110 is closed and the protruding element 103 is extended beyond an edge (or slightly into an opening 108) of the latching component 101. In this unlocked and closed state, the door 110 is closed but the locking mechanism is not locked. Thus, the door 110 may be opened by applying a light force to the door 110, such as with a foot, elbow or other object.

In position 121B, the locking mechanism 100 in an unlocked and open state. The door 110 is open and the protruding element 103 is extended due to its elastic property. In position 122B, the door is again closed and the locking mechanism 100 returns to the unlocked and closed state. In this state, the protruding element 103 extends beyond an edge or only partially into an opening 108 of the latching component 101 and the door 110 is held in place by the elasticity of the protruding element 103. The door 110 may remain in the closed position until a light force is applied to open the door 110.

Position 123B depicts the locking mechanism 100 in a locked and closed state. Here, the protruding element 103 extends through the opening 108 (not shown) of the latching component 101 locking the door 110 in the closed position.

Position 124B depicts the locking mechanism 100 in an unlocked and closed state. In this example, the door 110 is closed but the protruding element 103 is fully or at least sufficiently retracted by the locking component 102 such that the door 110 will swing open automatically, e.g., due to gravity springs, electric hinges, spring-loaded hinges, or other components. In other examples, the door 110 may open automatically by forces resulting from the locking component 102 retracting the protruding element 103.

Position 125B depicts the locking mechanism 100 returned to the unlocked and opened state. The door 110 is open and the protruding element 103 is extended slightly beyond the edge of the locking component 102 due to its elastic property.

Figure 2A:
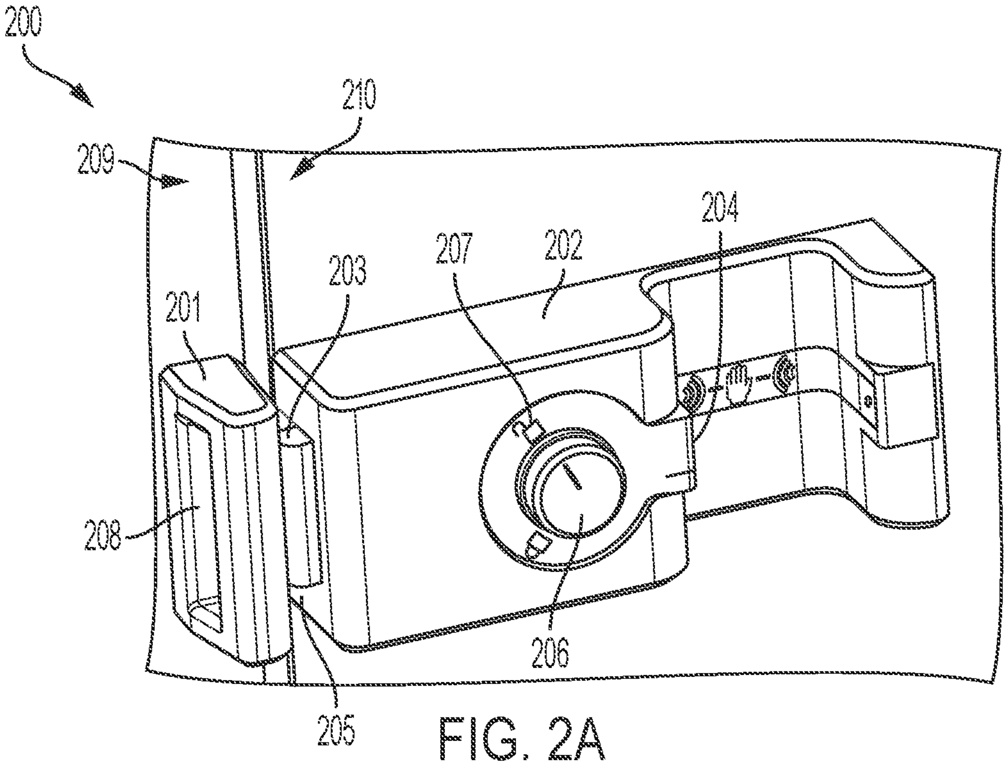
FIG. 2A depicts an exemplary locking mechanism, in accordance with various embodiments of the present disclosure.

FIG. 2A shows the locking mechanism 200 configured for use with an inwardly swinging door 210. In this embodiment, the latching component 201 is mounted to the inside surface of the door frame 209, substantially flush with the edge of the door frame 209. The locking component 202 is mounted on the door 210. In certain configurations, the locking component 202 may be mounted to the door 210 such that a portion of the locking component 202 extends slightly beyond the edge of the door 210. The portion extending beyond the edge of the door 210 may act as a stop when the door 210 is in the closed position, preventing the door from swinging outward from the stall. In other configurations, a separate stop may be placed on the outside of the door frame 209.

The components of the locking mechanism 200 shown in FIG. 2A may be the same or substantially the same as the corresponding components of the locking mechanism 100 shown in FIG. 1A. In particular, the locking component 202 includes a protruding element 203 having an elastic property enabled by one or more types of springs or other deformable structures. The protruding element 203 is configured to extend into an opening 208 in the latching component 201. The elastic property of the protruding element 203 allows the protruding element to extend only slightly into the opening 208 to hold the door in the unlocked and closed state. A motor, triggered by a sensor 204, such as a motion sensor, drives the protruding element 203 further through the opening 208 to place the locking mechanism 200 (and thus the door) in the locked and closed state. The sensor 204 also triggers the motor to retracts the protruding element 203 from the opening 208 to return the locking mechanism 200 to the unlocked and closed state or the unlocked and open state, as previously described. In some embodiments, a proximity sensor 205 may be included in or on the locking component 202 and/or the latching component 201 and configured to sense when the locking component 202 is within proximity to the latching component 201.

A knob 206 or other manually operated component may be provided to allow a user to manually, e.g., by physically grasping it, change the state of the locking mechanism 200 between locked and unlocked positions. The state of the locking mechanism 100 may be communicated to the user by a state display 207 or any other suitable indicator. The knob 206 or other manually operated component may include markings, such as an arrow or a line, such that when the knob 206 or other manually operated mechanism is used to move the protruding element 203, the orientation of the markings indicate a state of the locking mechanism 200.

Figure 2B:
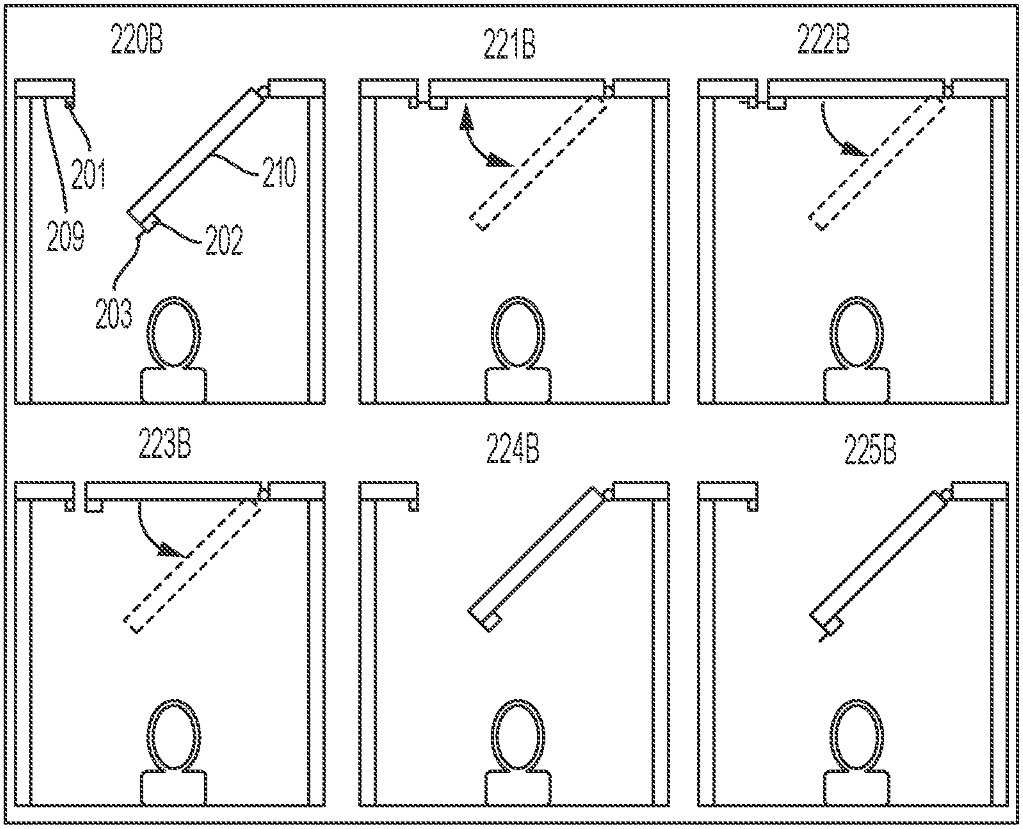
FIG. 2B depicts states of an exemplary locking mechanism and an inwardly swinging door, in accordance with various embodiments of the present disclosure.

FIG. 2B depicts the transitions between states of the exemplary locking mechanism 200 shown in FIG. 2A, as the inward-swinging door 210 is moved between closed and open positions. Position 220B depicts the locking mechanism 200 in an unlocked and open state. The door 210 is open, and the protruding element 203 is extended due to its elastic property.

Position 221B depicts the locking mechanism 200 in an unlocked and closed state. The door 210 has been closed, and the protruding element 203 remains extended. The protruding element 203 has not been further extended through the latching component 201 to lock the locking mechanism 200. In the closed and unlocked state, the door 210 is closed and the protruding element 203 engages the latching component 201. The protruding element 203 extends slightly into an opening 208 (not shown) of the latching component 201 such that the door 210 may remain in a closed position until a light force is applied to open the door 210.

Position 222B depicts the locking mechanism 200 in a locked and closed state. The protruding element 203 is extended fully or more fully through the opening 208 of the latching component 201 locking the door 210.

Position 223B depicts the locking mechanism 200 in a second unlocked and closed state. In this example, the door 210 is closed but the protruding element 203 is fully or at least sufficiently retracted by the locking component 202 such that the door 210 will swing open automatically, e.g., due to gravity springs, electric hinges, spring-loaded hinges, or other components. In some embodiments the door 210 may automatically swing open by forces resulting from retraction of the protruding element 203 by the locking component 202.

Position 224B depicts the locking mechanism 200 as it begins to return to the unlocked and opened state. The door 210 is open and the protruding element 203 is retracted within the locking component 202. Then, in position 225B, the protruding element 203 is extended slightly beyond the edge of the locking component 102 due to its elastic property.

Exemplary Circuit

Figure 3:
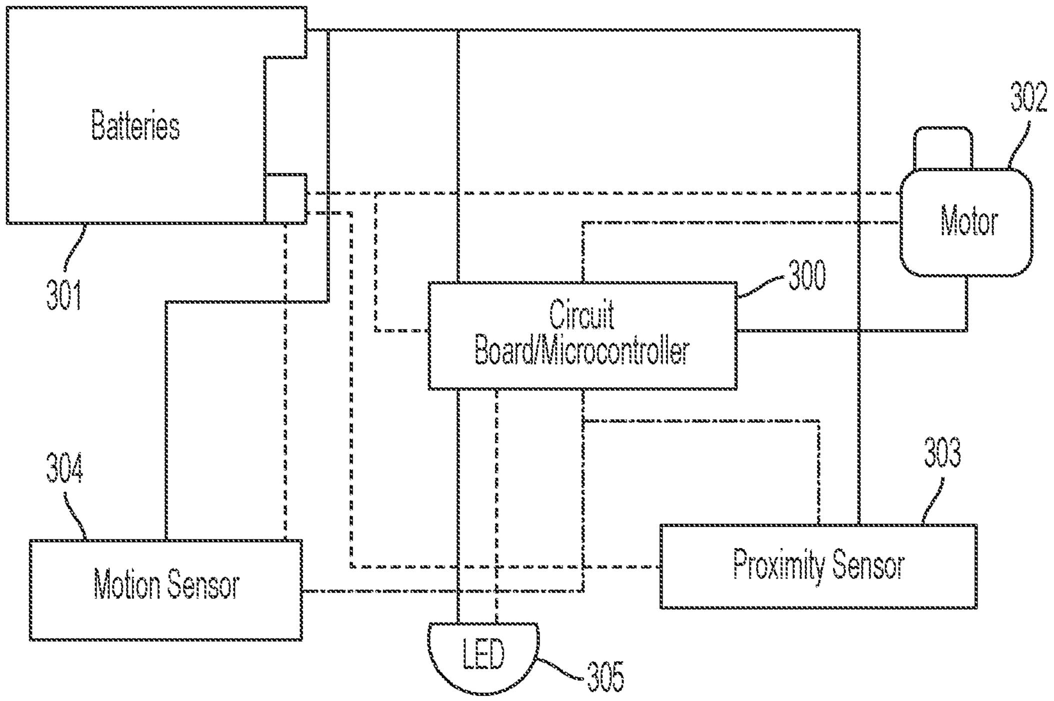
FIG. 3 depicts a block diagram representing a circuit of an exemplary locking component, in accordance with various embodiments of the present disclosure.

FIG. 3 depicts a block diagram representing the internal components of the exemplary locking mechanism, such as the locking mechanism 100 shown in FIG. 1 and the exemplary locking mechanism 200 shown in FIG. 2. A micro-controller 300 is powered by a power source 301, which may be a battery, a conductive wire connected to a power outlet, or other power source. The micro-controller 300 (or other logic circuit or processor) is operably connected to one or more sensors, such as a proximity sensor 303, a motion sensor 304 or similar devices. The micro-controller 300 may be also connected to an LED 305 and motor 302.

The motor 302 may have but is not limited to the capability of moving the protruding element 103, 203. The motor 302 may be, but is not limited to the capabilities of, a servo motor. Using a potentiometer, the motor 302 may communicate with the micro-controller 300 to determine its position. This may allow the motor 302, when triggered by a sensor 304, to move the protruding element 103, 203 to its proper position based on the users input detected by the motion sensor 304 and/or information from proximity sensor 303.

The motion sensor 304 may have, but is not limited to, the capability of triggering the motor 302 without the user physically manipulating the locking mechanism 100, 2003 (contactless manipulation.) In some embodiments, the motion sensor 304 may also work in parallel with the proximity sensor 303 to limit the motion sensor 304 from activating the locking component 102, 202 if the door 110, 210 is in the opened position. In other words, a signal from the proximity sensor 303 can be used by the micro-controller 300 to prevent the motor 302 from adjusting the position of the protruding element 103, 203 while the door 110, 210 is in an opened position.

The microcontroller 300 may have, but is not limited to, a communications module (not shown) to communicate with external systems and devices using Bluetooth, WIFI, RF, 3G, 4G, 5G, UHB and other wireless or wired communication technology. In some examples, a communications module may be configured by firmware for connecting to an internet of things (IoT) system. The communications module may communicate information such as, but not limited to battery level, number of activations/uses, and amount of time the locking mechanism 100, 200 is in a particular state (open and unlocked, closed and unlocked, closed and locked), to devices including but not limited to servers, smartphones, management apps, mobile devices, and computers. The IoT capabilities of the micro-controller 300, including Bluetooth and WIFI, may also communicate with other hardware including but not limited to electromechanically powered hinges with similar capabilities.

For example, in some embodiments, the locking mechanism 100, 200 may include mechanically or electromechanically powered hinges that tend the door 110, 210 to move into the open position when the locking component 102, 202 is disengaged from the latching component 101, 201. The door 110, 210 preferably may have a resting state at an angle wide enough to allow the user to exit. The hinges also preferably take into account the vertical movement of some stall doors including but not limited to doors with gravity hinges. The hinges may be electromechanically powered and may communicate with the locking component 102, 202 via wireless (for example Bluetooth) or wired means. This electromechanically powered hinge may be triggered to close and open the door via existing sensing technology of the locking component 102, 202 or other additional triggers that include physical and wireless triggering methods including buttons, switches, pressure sensors, and inductive, optical, infrared, capacitive, magnetic or ultrasonic sensing technology.

The LED 305 may display light in one or more colors. The color of the LED may indicate to the user information about the locking mechanism 100, 200, such as but not limited to whether the locking mechanism 100, 200 is being triggered to change states between locked and unlocked, whether the locking mechanism 100, 200 is locked or unlocked, whether the battery 301 needs to be replaced or recharged, or whether the locking mechanism 100, 200 is connected or disconnected from an IoT system or other network. Multiple LED's may be included in some designs. Other types of state displays may be used in addition to or instead of an LED 305 to visually display a state of the locking mechanism 100, 200. For example, battery level may be indicated by separate visual means, including a solid-state display. Another example of a state display may be markings or colorings on the locking mechanism 100, 200.

The battery 301 may be rechargeable or disposable. These batteries may be but are not limited to lithium, alkaline, carbon zinc, silver oxide, or zinc air batteries. Alternatively, the micro-controller may be powered by being plugged into a standard (AC) power outlet or connected directly to a facility's grid by installation as a fixture. Some of the functionalities of the locking mechanism 100, 200 may be powered by one power source (e.g., battery 301), while other functionalities may be powered by different power sources (e.g., AC power).

Further Exemplary Locking Mechanisms

Figure 4:
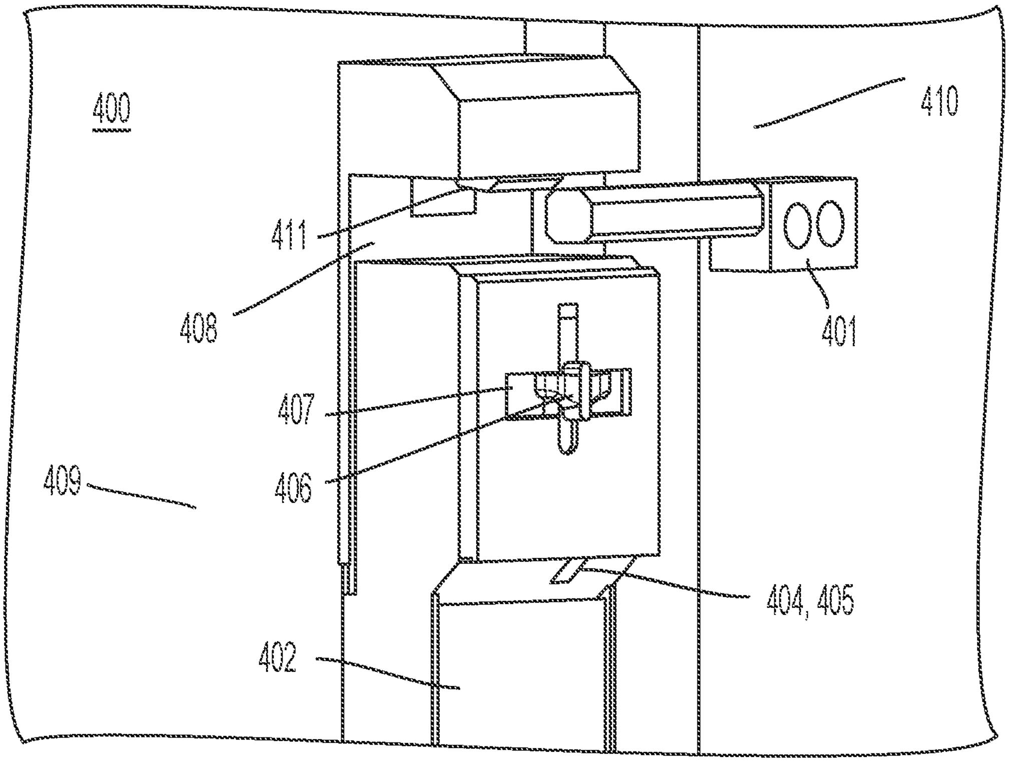
FIG. 4 depicts an exemplary locking mechanism in an unlocked state, in accordance with various embodiments of the present disclosure.

FIG. 4 depicts another example of a locking mechanism 400. The locking mechanism 400 may include locking component 402 which may be mounted on a door frame 409 and a latching component 401 may be mounted on a door 410. In some embodiments, the latching component may have some degrees of freedom in the vertical and horizontal direction when contacted. Alternative configurations may mount locking component 402 on the door 410 and the latching component 401 on the door frame 409.

The latching component 401 may be a bolt or other latch element that extends past the door 410, when the latching component is mounted on the door 410, far enough to reach an elastic component 411 in opening 408 of the locking component 402. The elastic component 411 may exert sufficient force on the latching component 401 to hold it the closed and unlocked position until a force is applied to move the door 410 into the open position. The force that is required to dislodge the latching component 401 from the elastic component 411 may be adjustable.

A protruding element 403 (shown in FIG. 5) of the locking component 402 may be extended and retracted by a motor located inside the locking component 402. When extended, the protruding element 403 blocks the opening 408 so that the latching element 401 cannot be dislodged from the opening 408 with minimal force. One or more sensors 404, 405 may sense user action. Sensor 404 or 405 may be programmed to trigger when certain parameters are met. When the sensor parameters are met, the sensor 404 or 405 may trigger the motor to extend or retract the protruding element 403. Alternatively, both sensors 404 and 405 may trigger when certain parameters are met.

For example, a motion sensor 404 can change the state of the locking component 402 between locked and unlocked states via contactless manipulation. A proximity sensor 405 may be configured to recognize when the door 410 is in the open or closed position, similar to the function of a reed switch in a security system connected to a door that communicates when the door is opened and closed.

A tab 406 may allow a user to manually, e.g., by physically grasping it, change the state of the locking mechanism 400 between locked and unlocked positions by applying force to move position of a protruding element 403. The tab 406 may also move from one position to another when the protruding element 403 is extended and retracted by the motor of the locking component 402.

A state display 407 on the protruding element 403 indicates whether the locking component 402 is locked or unlocked. The state display 407 may be a simple color indicator that moves in cooperation with or is covered/uncovered by the moving tab 406. The locking mechanism may additionally or alternatively include other types of state displays, such as LEDs. A state display may be placed at locations on the locking component 402 other than that shown in FIG. 4.

Figure 5:
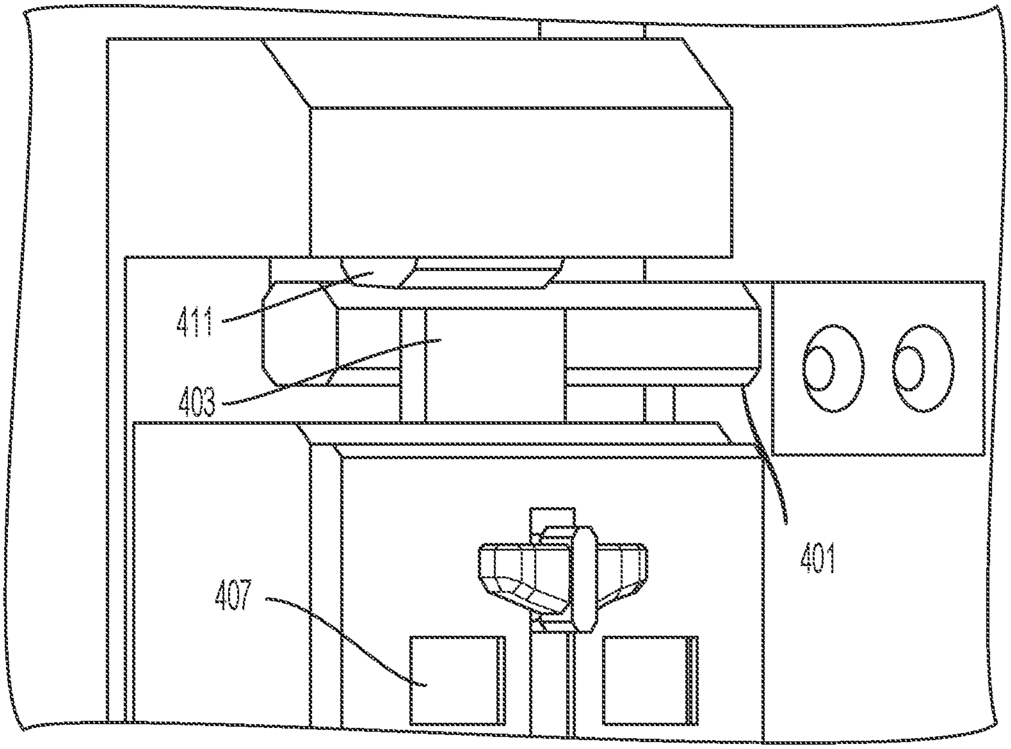
FIG. 5 depicts an exemplary locking mechanism in a locked state, in accordance with various embodiments of the present disclosure.
Figure 6:
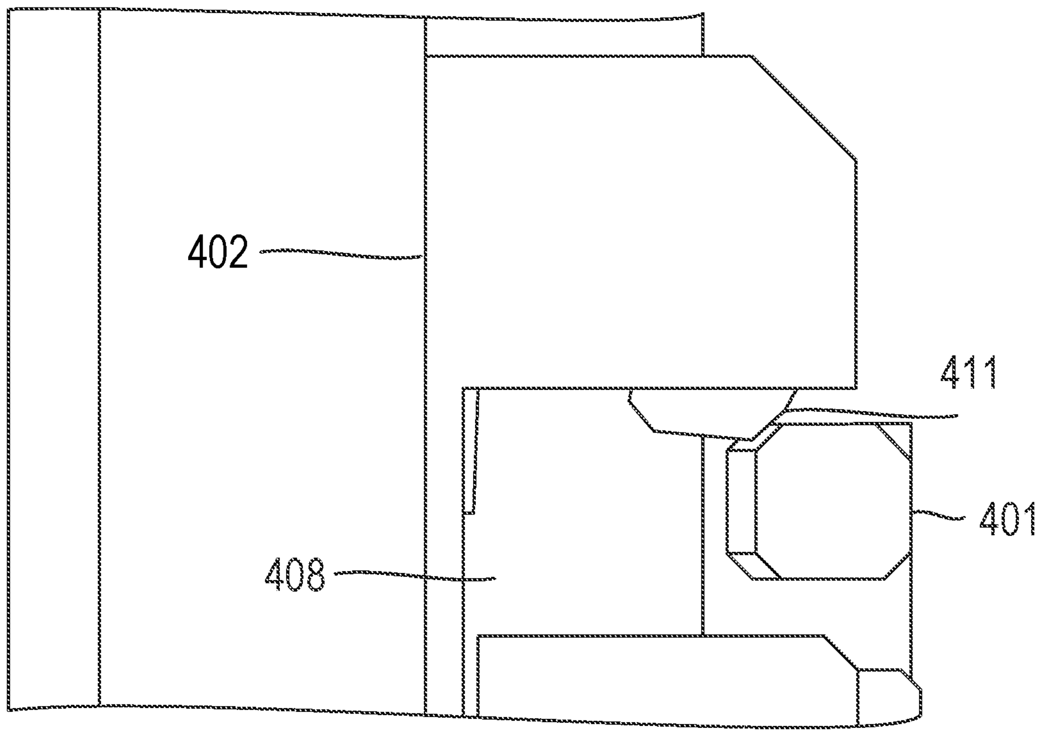
FIGS. 6, 7, 8, 9, 10, and 11 depict movement of a bolt and an elastic component of an exemplary locking mechanism while the locking mechanism is in an unlocked state, in accordance with various embodiments of the present disclosure.

To utilize the motion sensing feature of the disclosure, the user may move a preferred appendage within the range of the motion sensor 404. When the motion sensor 404 is triggered initially, a motor or other mechanized component within the locking component 402 will extend the protruding element 403 towards the opening 408 of the locking component 402. When the door 410 is in the closed and unlocked position, the latching component is within the opening 408 and extending the protruding element 402 cause the protruding element 403 to be in front of the latching component 401, thereby trapping the latching component within the opening 408. FIG. 5 shows the locking mechanism in its locked and closed state. In this locked and closed state, the low amount of force that previously could dislodge the door 410 when in the unlocked and closed state may no longer dislodge the door 410.

Retracting the protruding element 403 into the locking component 402, e.g., by the motor when triggered by a sensor 404, clears the opening 408 and allows the latching component 401 to be removed therefrom. In some embodiments, the latching component 401 may remain within the opening 408 when the protruding element 403 is retracted, due to the elastic component 411. In other examples, retracting the protruding element 403 causes the latching component 401 to automatically move out of the opening, i.e., causes the door 410 to automatically swing open. In some examples, the door 410 and door frame 409 may include a form of mechanically or electrically powered hinges that tend the door 410 to move into the open position when the latching component 401 of the disclosure is disengaged from the locking component 402 of the disclosure. The door 410 preferably may have a resting state at an angle wide enough to allow the user to exit. The hinges also preferably take into account the vertical movement of some stall doors including but not limited to doors with gravity hinges.

Operation of the locking mechanism 400 may be controlled by a micro-controller 300 and control circuit such as that shown in FIG. 3. In some embodiments, the locking mechanism 400 may be configured to include communication technology such as but not limited to Wi-Fi, Bluetooth, RF, cellular, and other communication technologies described previously. As mentioned, communication components may be used to configure the locking mechanism 400 to communicate with IoT systems. The locking mechanism 400 may communicate information such as but not limited to the whether the door 410 is locked, how often the door 410 has been locked or unlocked over a period of time, peak times of locking mechanism 400 usage, etc. This information may useful as it could provide information such as but not limited to whether the bathrooms are unoccupied. Other information gathered from the locking mechanism 400 may be used as estimates to make determinations about the state of the restroom. These may include examples such as but not limited to whether the bathroom needs to be restocked, serviced, or cleaned.

FIGS. 6-11 show additional details of the locking mechanism 400 as it transitions from an unlocked and open state to a locked and closed state. Beginning in FIG. 6, the door 410 is open but has been swung towards the closed position. Here the latching component 401 starts to enter the opening 408 of the locking component 402 and makes contact with the elastic component 411. The latching component 401 pushes the elastic component 411. The elastic component 411 is slightly retracted or otherwise moved by the latching component 401 so as to allow the latching component to enter into the opening 408. In some embodiments, the elastic component 411 is pushed in like a button.

Figure 7:
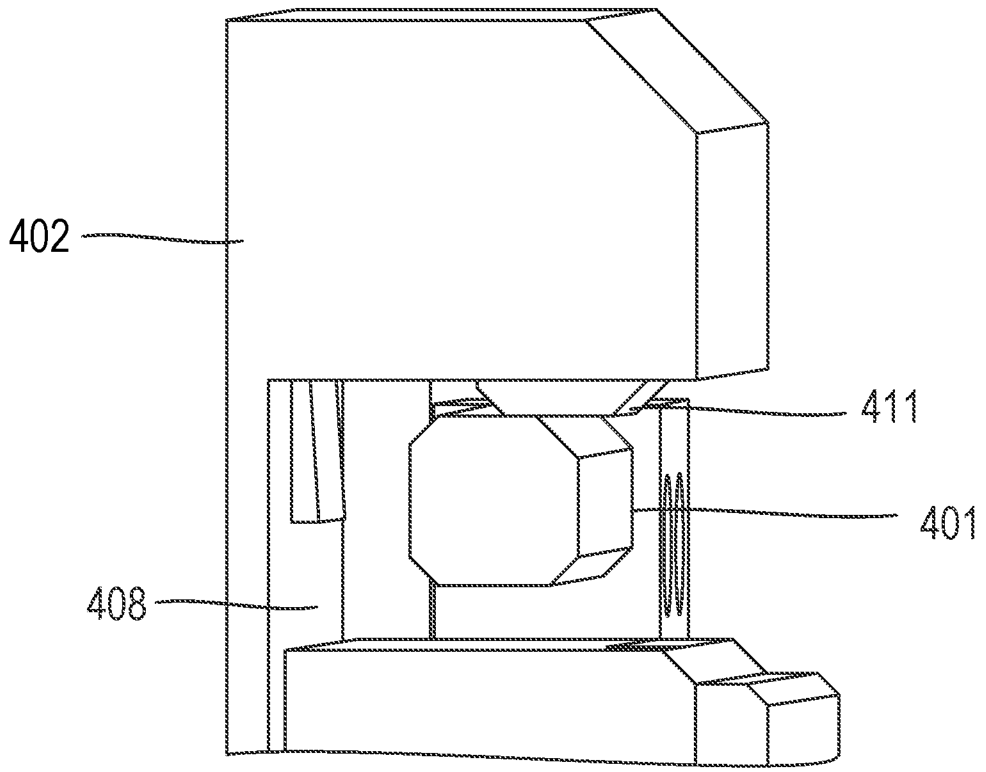
Figure 8:
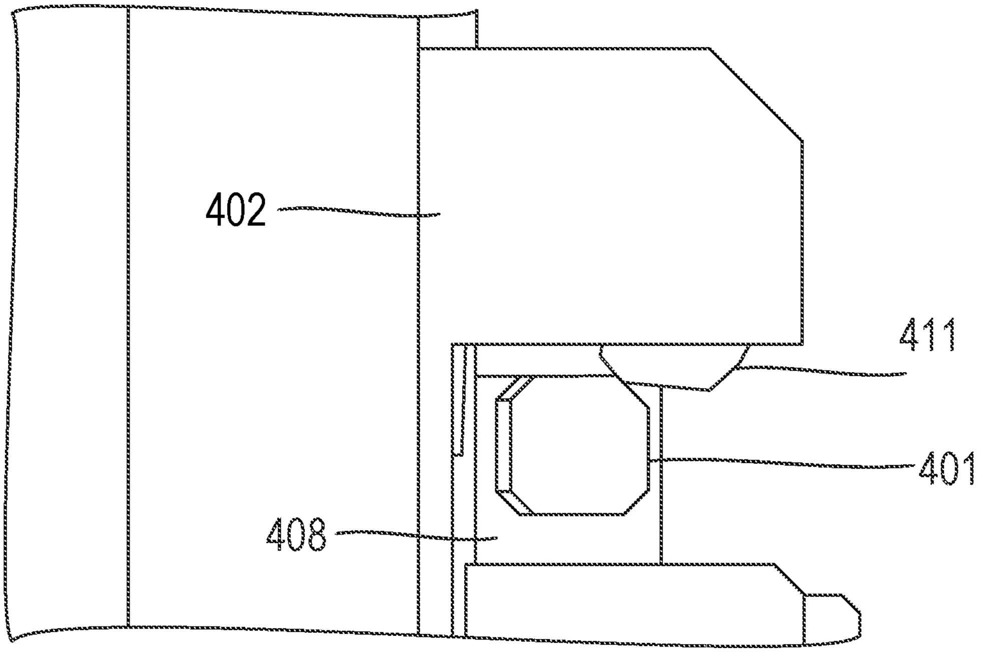
Figure 9:
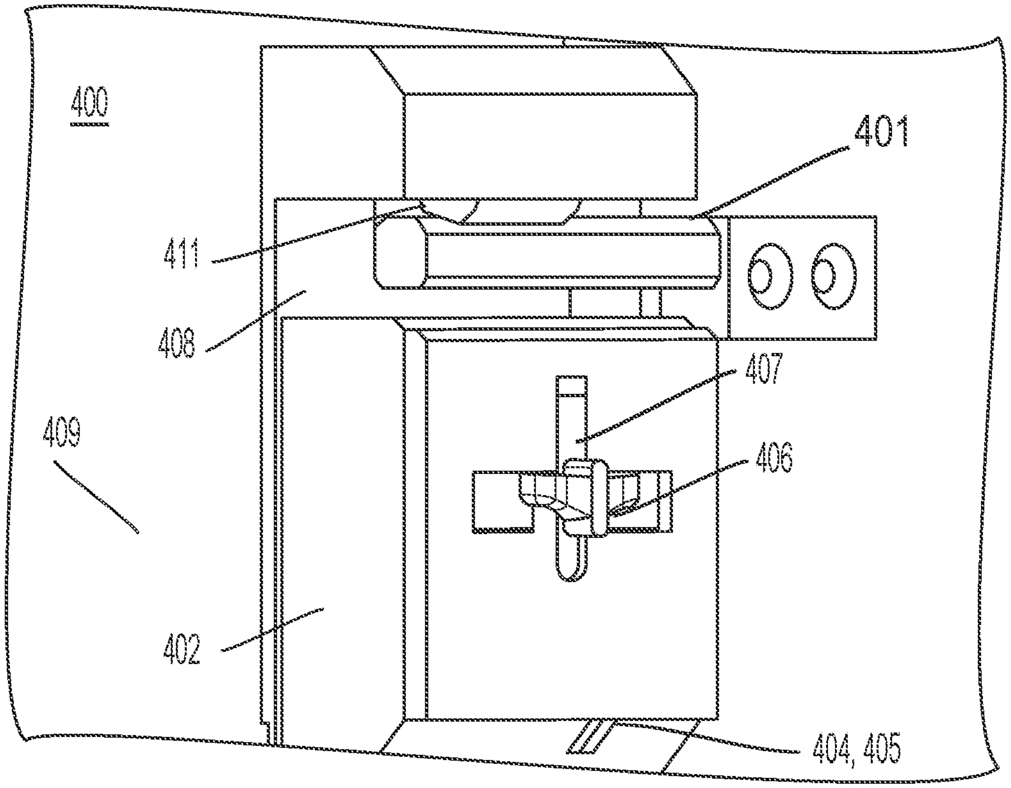

FIG. 7 depicts the elastic component 411 being pushed out of the way of the latching component 401. FIG. 8 depicts the latching component 401 moving further into the opening 408 of the locking mechanism 400. The elastic component 411 remains in contact with the latching element 401, holding the latching component 401 within the opening 408 of the locking component. In this position, the locking mechanism 400 is in the unlocked and closed state. FIG. 9 is another view of the locking mechanism 400 in the unlocked and closed state. While in the unlocked and closed state, a light force may be used to open the door 410. Applying force to the door causes the latching component to 401 push the elastic component 411 upward, such that it no longer prevents the latching component 401 from escaping the opening 408 of the locking component 402.

Figure 10:
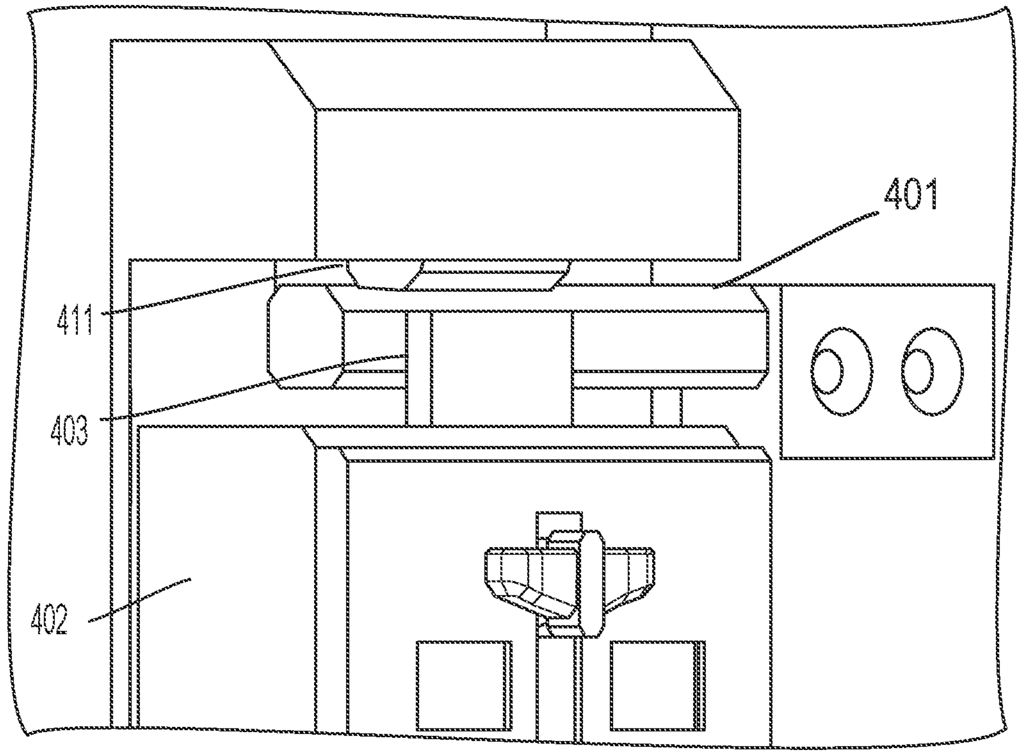
Figure 11:
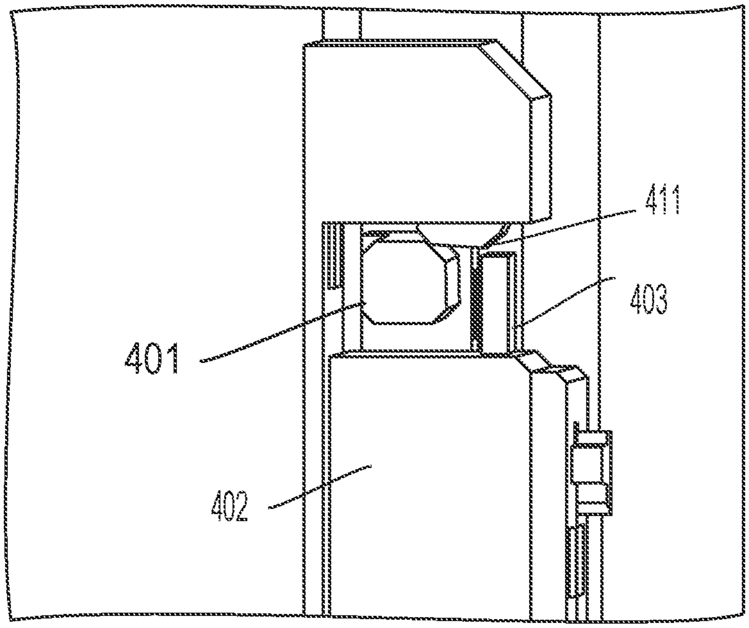

FIG. 10 and FIG. 11 depict the locking mechanism 400 as it transitions to the locked and closed state. Protruding element 403 is extended by the locking component 202 to block the opening 408. As described, the protruding element 403 may be extended by a motor within the locking component, which may be triggered by a motion sensor or other sensor (not shown).

Figure 12A:
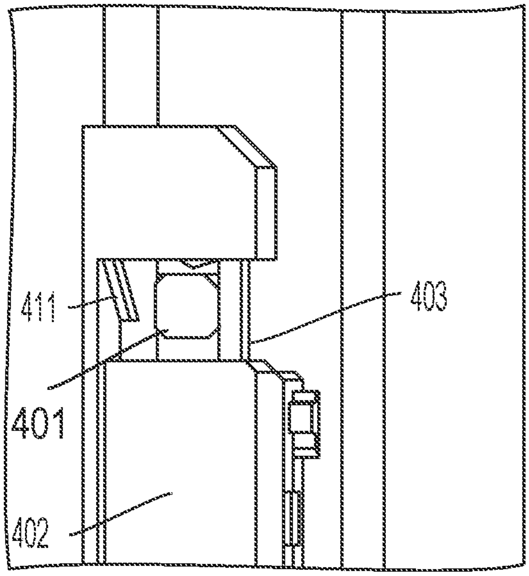
FIGS. 12A, 12B, 12C, and 12D depict an exemplary locking mechanism transitioning from a locked state to an unlocked state, in accordance with various embodiments of the present disclosure.

FIG. 12A-12D depict the transition of the locking mechanism 400 from a locked and closed state to an unlocked and open state. In FIG. 12A, the protruding element 403 is fully extended and contacts the elastic component 411, pushing the elastic component 411 upward and out of contact with the latching component 401. In some embodiments, the elastic component 411 may include a tab or extension that extends downward into the back of the opening 408. In this configuration, the tab or extension of the elastic component 411 may be moved forward towards the latching element 401 when the elastic component 411 is pushed upward by the protruding element 403. The tab or extension can serve to narrow the opening 408, such that the latching mechanism does not have as much room to move within the opening 408 when the door 410 is closed. This may provide further stability to the door 410 when in the closed position.

Figure 12C:
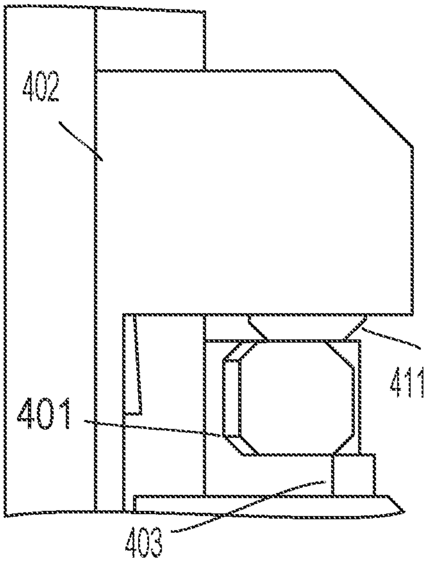
Figure 12B:
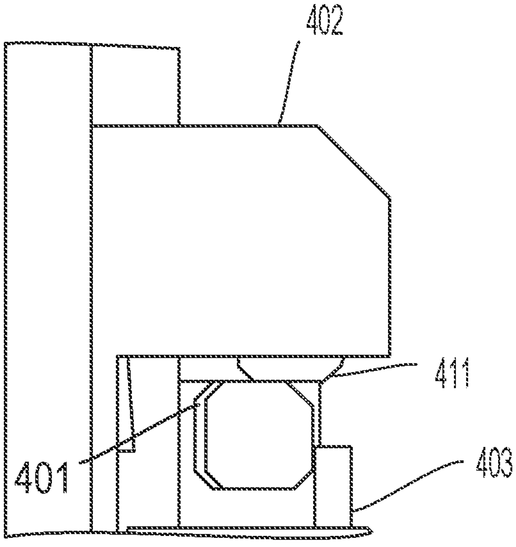
Figure 12D:
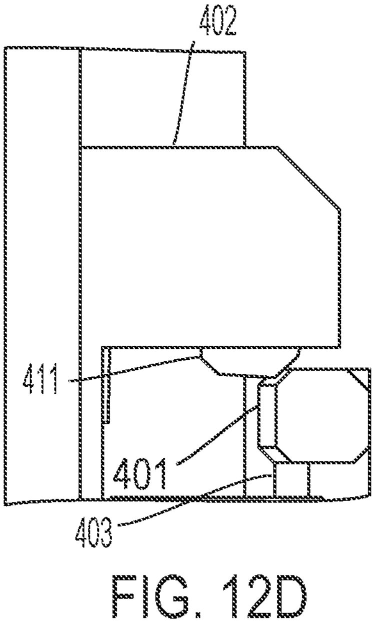

In FIG. 12B, the protruding element 403 begins to retract into the locking component 402. The protruding element 403 loses contact with the elastic component 411. FIG. 12C shows the protruding element as it moves forward under the elastic component 411. FIG. 12D depicts the locking component 402 as it returns to the unlocked and open state. The latching component 401 moves forward of the elastic component 411 and is therefore no longer held within the opening 408 by the elastic component 411.

Further Examples of Locking Mechanisms

Figure 13:
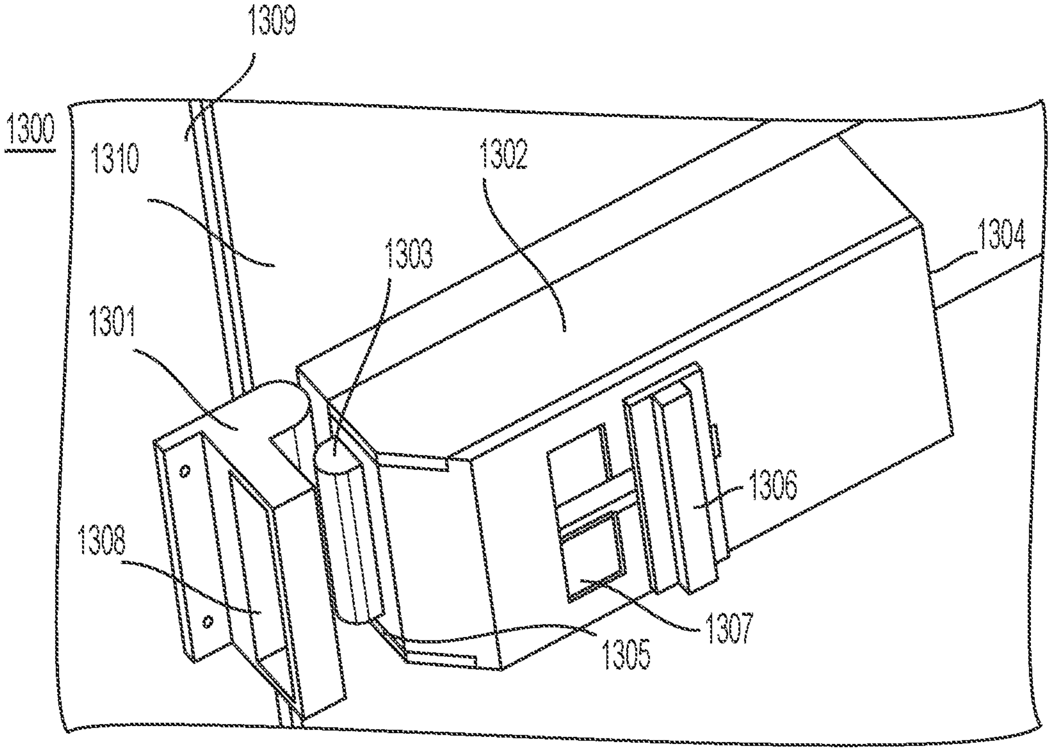
FIG. 13 depicts an exemplary locking mechanism, in accordance with various embodiments of the present disclosure.
Figure 14:
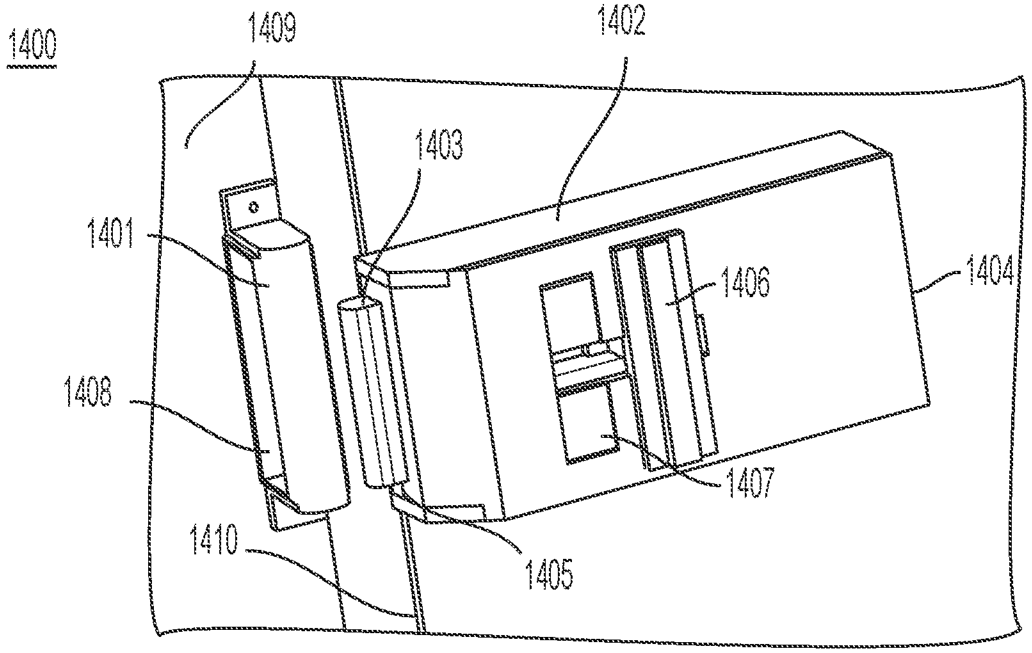
FIG. 14 depicts an exemplary locking mechanism, in accordance with various embodiments of the present disclosure.

FIGS. 13 and 14 depict further examples of locking mechanisms 1300, 1400 according to the present invention. The locking mechanism 1300 of FIG. 13 is configured for an outwardly opening door and the locking mechanism 1400 of FIG. 14 is configured for an inwardly opening door.

FIG. 13 depicts a locking mechanism 1300 according to certain embodiments of the present invention. The locking mechanism 1300 includes a latching component 1301 mounted to the door frame 1309 and a locking component 1302 mounted to the door 1310. In FIG. 13, the latching component 1301 is mounted to the edge of the inside wall of the door frame 1309, extending slightly beyond the edge of the door frame 1309. The portion extending beyond the edge of the door frame 1309 contacts the door 1310 and thereby acts as a stop when the door 1310 is closed, which prevents the door 1310 from swinging into the stall. The latching component 1301 has an opening configured to receive a protruding element 1303 of the locking component 1302. The protruding element 1303 protrudes or extends from the locking component 1302 into the opening 1308 to lock the locking mechanism 1300. The protruding element 1303 may be, for example, a bolt or other latch element.

As with other embodiments, the protruding element 1303 may be extended and retracted by a motor located inside the locking component 1302. One or more sensors 1304, 1305 may sense user action to trigger movement of the motor. The protruding element 1303 may also be provided with an elastic property by way of springs or other deformable elements. The elasticity of the protruding element 1303 causes it to extend slightly from the locking component 1302 when in its resting position. In this manner, the protruding element 1303 extends beyond the protruding edge of the latching component 1301 and/or slightly into the opening 1308 to hold the door in the unlocked and closed state.

In some embodiments, the locking mechanism 1300 may be configured for hands-free and manual operation. A tab 1306 allow a user to manually change the state of the locking mechanism 1300 between locked and unlocked positions by applying force to move the position of the locking bolt. The state of the locking mechanism may be communicated to the user by a state display 1307. Operation of the locking mechanism 1300 may be controlled by a micro-controller 300 and control circuit such as that shown in FIG. 3.

FIG. 14 depicts an exemplary locking mechanism 1400 mounted to an inwardly opening door. The latching component 1401 is mounted to the door frame 1409, substantially flush with the edge of the door frame 1409. The latching component 1401 includes an opening 1408 to receive a protruding element 1403 of the locking component 1402. In certain configurations, the locking component 1402 may be mounted to the door 1410 such that a portion of the locking component 1402 extends slightly beyond the edge of the door 1410. The portion extending beyond the edge of the door 1410 may act as a stop when the door 1410 is in the closed position, preventing the door from swinging outward from the stall. In other configurations, a separate stop may be placed on the outside of the door frame 1409.

The protruding element 1403 may have an elastic property as previously described. A motor, triggered by one or more sensors 1404, 1405, drives the protruding element 1403 into and out of the opening 1408 of the latching component 1401. A knob 1406 or other manually operated component may be provided to allow a user to manually, e.g., by physically grasping it, change the state of the locking mechanism 1400 between locked and unlocked positions. The state of the locking mechanism 1400 may be communicated to the user by a state display 1407 or any other suitable indicator. Operation of the locking mechanism 1400 may be controlled by a micro-controller 300 and control circuit such as that shown in FIG. 3.

Figure 15A:
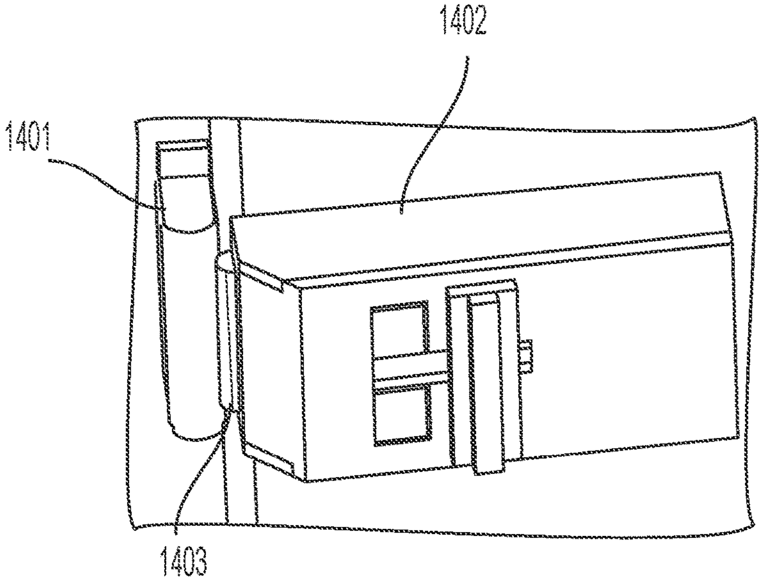
FIGS. 15A and 15B depict an exemplary locking mechanism in an unlocked and open state, in accordance with various embodiments of the present disclosure.
Figure 15B:
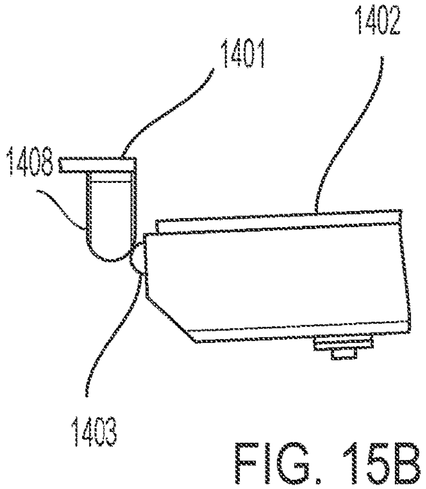
Figure 16A:
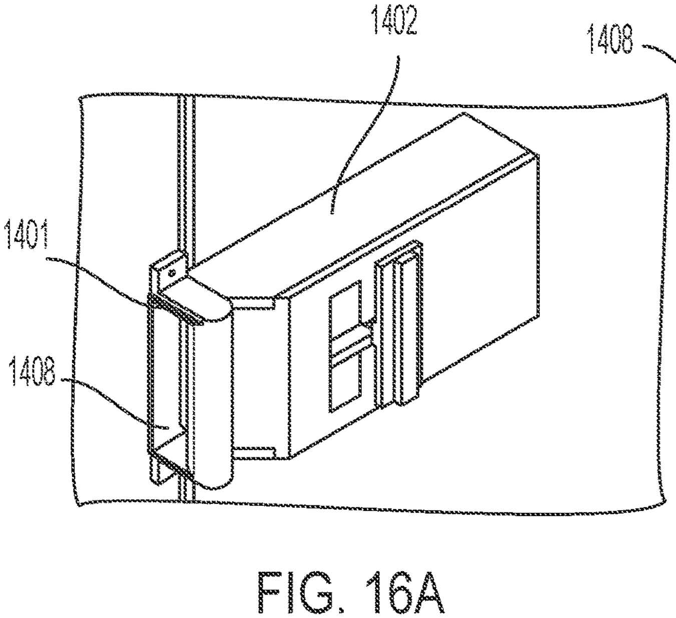
FIGS. 16A and 16B depict an exemplary locking mechanism in an unlocked and closed state, in accordance with various embodiments of the present disclosure.
Figure 16B:
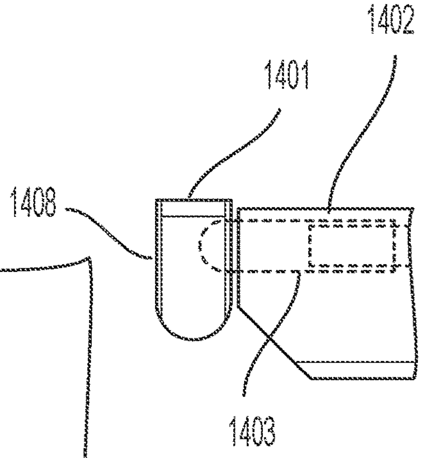

FIG. 15A and FIG. 15B depict the locking mechanism 1400 of FIG. 14 in an unlocked and open state. As shown, the protruding element 1403 of the locking component 1402 is in front of the latching component 1401. FIG. 16A and FIG. 16B depict the locking mechanism 1400 in an unlocked and closed state. Here, the protruding element 1403 of the locking component 1402 is extended only slightly into the opening 1408 of the latching component 1401. The elastic property of the protruding element 1403 holds it in place within the opening 1408, but allows it to be pushed out of the opening 1408 when force is applied to the door 1410.

Figure 17A:
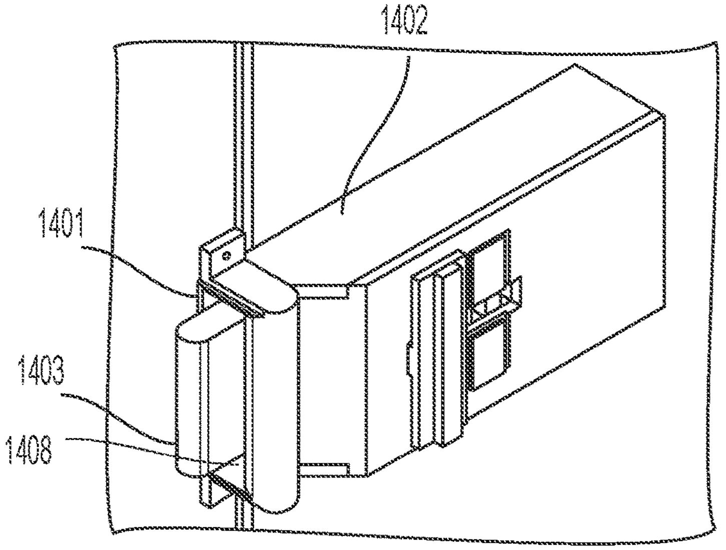
FIGS. 17A and 17B depict an exemplary locking mechanism in a locked state, in accordance with various embodiments of the present disclosure.
Figure 17B:
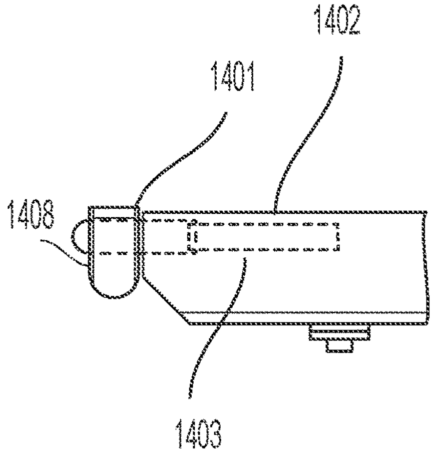

FIG. 17A and FIG. 17B depict the locking mechanism 1400 in a locked and closed state. The protruding element 1403 of the locking component 1402 extends fully or at least further through the opening 1408 of the latching component 1401, thereby locking the locking mechanism 1400 and thus the door 1410.

Figure 18A:
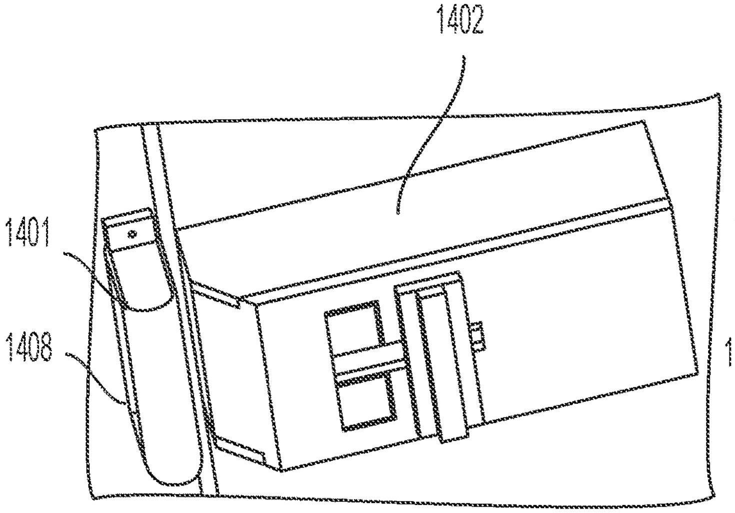
FIGS. 18A and 18B depict an exemplary locking mechanism in an unlocked state, in accordance with various embodiments of the present disclosure.
Figure 18B:
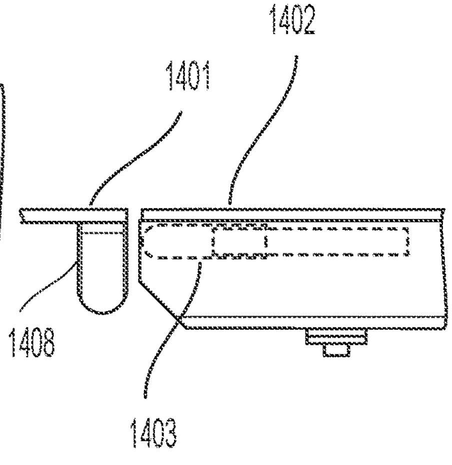
Figure 19A:
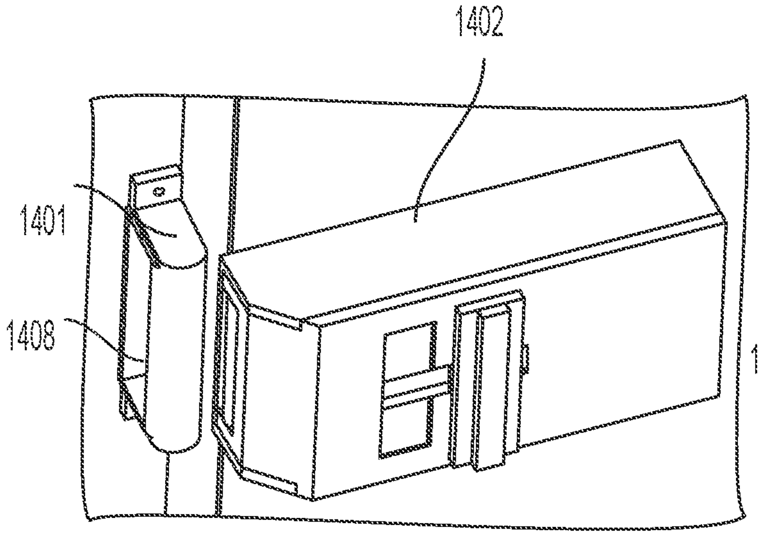
FIGS. 19A and 19B depict an exemplary locking mechanism in an unlocked and open state, in accordance with various embodiments of the present disclosure.
Figure 19B:
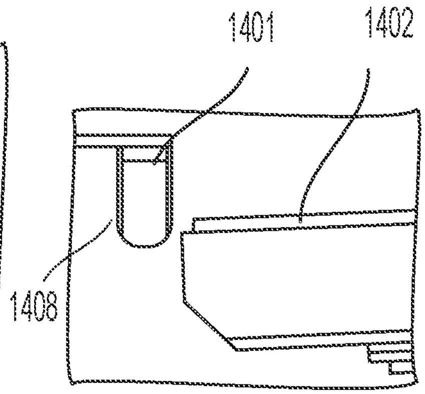

FIG. 18A and FIG. 18B show the locking mechanism 1400 when the protruding element 1403 is retracted into the locking component 1402. In this embodiment, the protruding element 1403 is fully retracted such that it does not make contact with the latching component 1401. As shown in FIGS. 19A and 19B, the locking component 1402 may automatically swing away from the latching component 1401 when the protruding element 1403 is fully retracted into the locking component 1402.

Figure 20A:
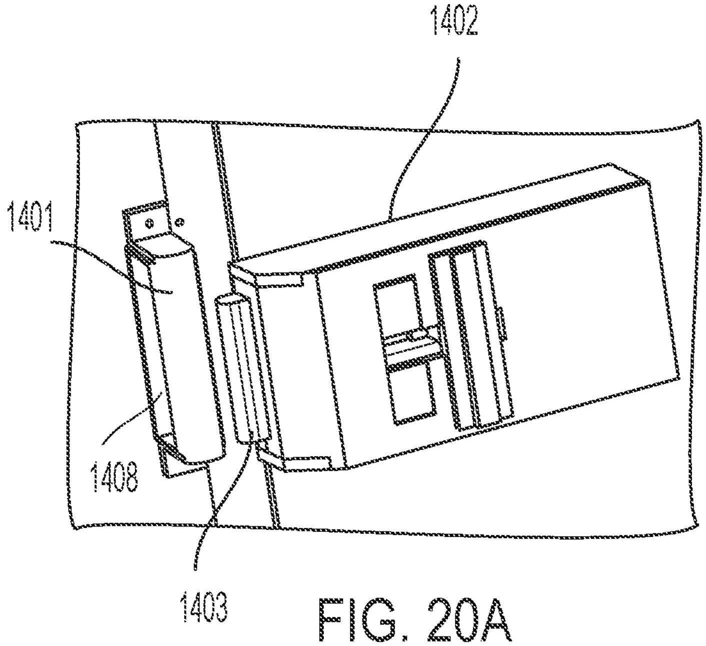
FIGS. 20A and 20B depict an exemplary locking mechanism in an unlocked and open state, in accordance with various embodiments of the present disclosure.
Figure 20B:
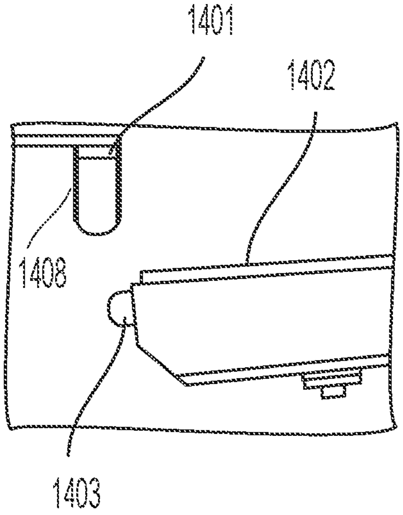

FIG. 20A and FIG. 20B depict the locking mechanism 1400 when it has returned to an unlocked and open state. The locking component 1402 has swung away from the latching component 1401 and the protruding element 1403 is again partially extended due to its elastic property.

Figure 21A:
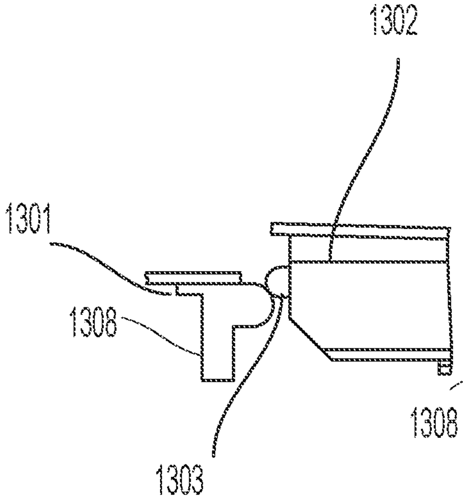
FIGS. 21A, 21B, 21C, 21D, and 21E depict interaction of an elastic component with a latching component of an exemplary locking mechanism, in accordance with various embodiments of the present disclosure.
Figure 21B:
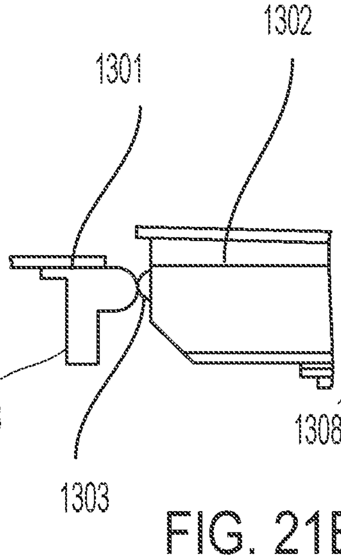
Figure 21C:
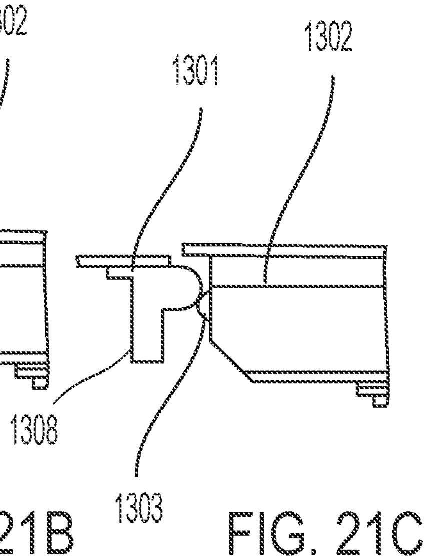
Figure 21D:
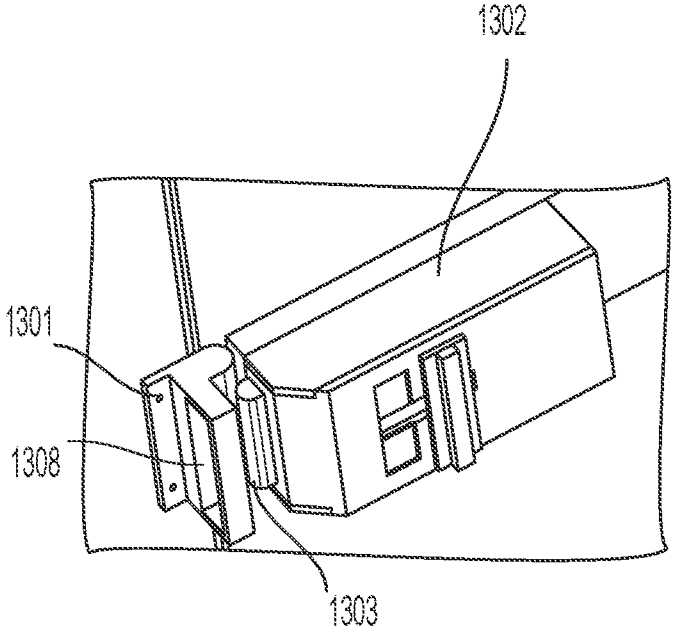
Figure 21E:
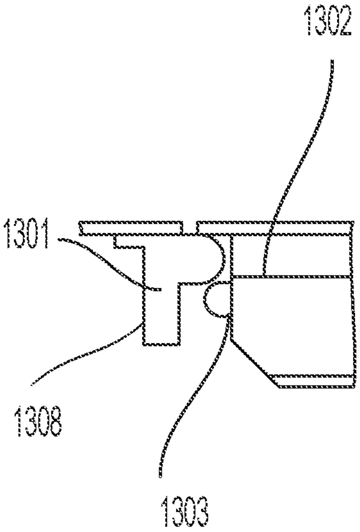

FIGS. 21A-21E depict movement of the protruding element 1303 of the exemplary locking mechanism 1300 shown in FIG. 13. In FIG. 21A, the protruding element 1303 of the locking component 1302 comes into contact with the latching component 1301 when the outwardly opening door is swung towards it closed position. As shown in FIGS. 21B and 21C, the elastic property of the protruding element 1303 causes it to retract when it comes into contact with the latching component 1301 and to extend again as it and passes by the latching component 1301. FIG. 21D and FIG. 21E show the locking mechanism 1300 in its unlocked and closed state. In this example, the protruding element 1303 does not extend into the opening 1308 of the latching component 1301; extending behind the latching component is sufficient to maintain the locking mechanism 1300 in the unlocked and closed position.

Figure 22A:
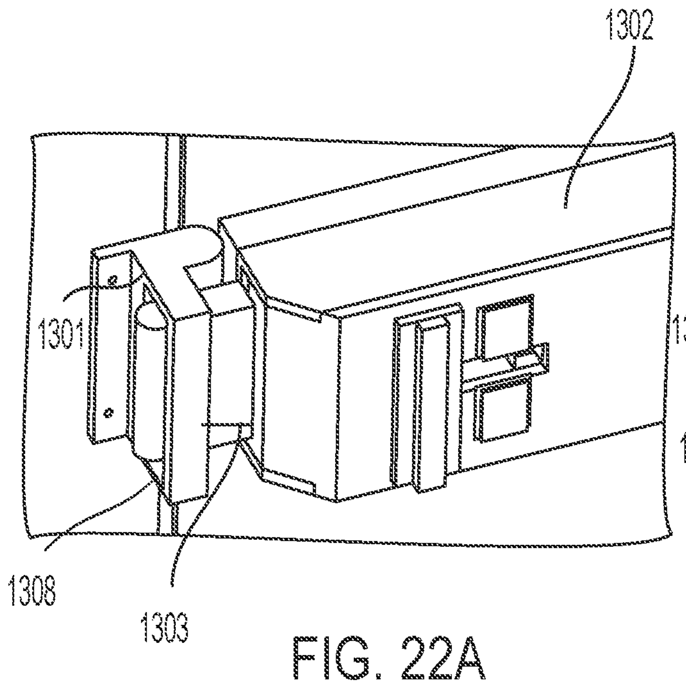
FIGS. 22A and 22B depict an exemplary locking mechanism in a locked state, in accordance with various embodiments of the present disclosure.
Figure 22B:
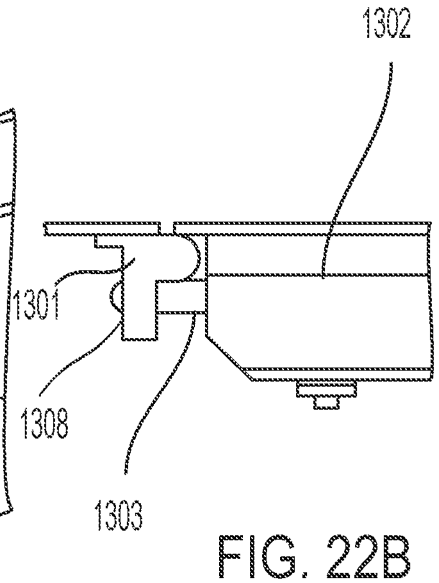

FIG. 22A and FIG. 22B depict the locking mechanism 1300 in a locked and closed state. The protruding element 1303 is now extended into the opening 1308 of the latching component 1301 and prevents the door 1310 from opening when force is applied to it.

Figure 23A:
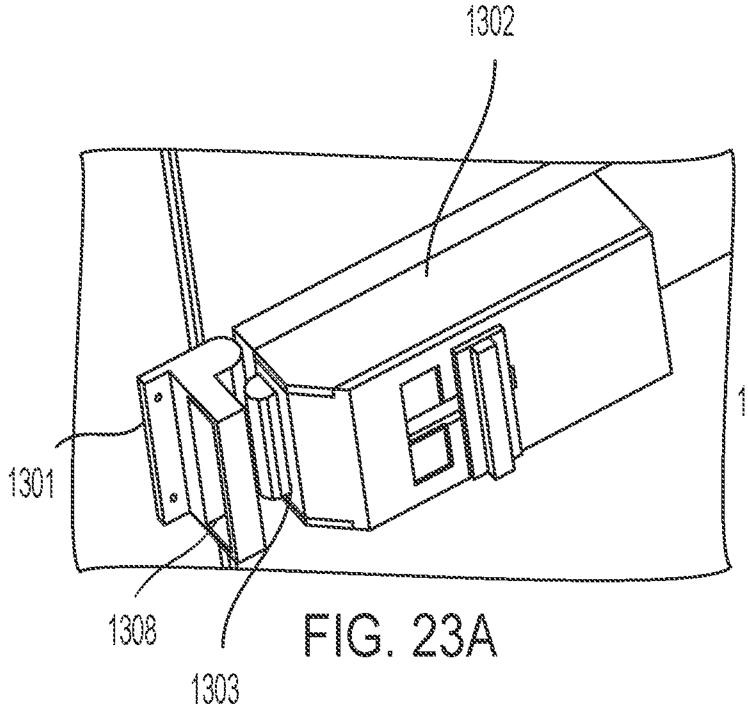
FIGS. 23A and 23B depict an exemplary locking mechanism in an unlocked and closed state, in accordance with various embodiments of the present disclosure.
Figure 23B:
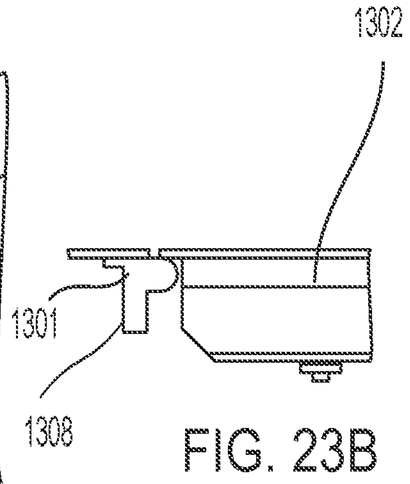

FIG. 23A depicts the locking mechanism 1300 as the protruding element 1303 is being retracted to an unlocked state. In FIG. 23B, the protruding element 1303 is fully retracted into the locking component 1302, which would allow the door 1310 to freely and/or automatically swing open, for example due to gravity springs or other components described herein.

Figure 24:
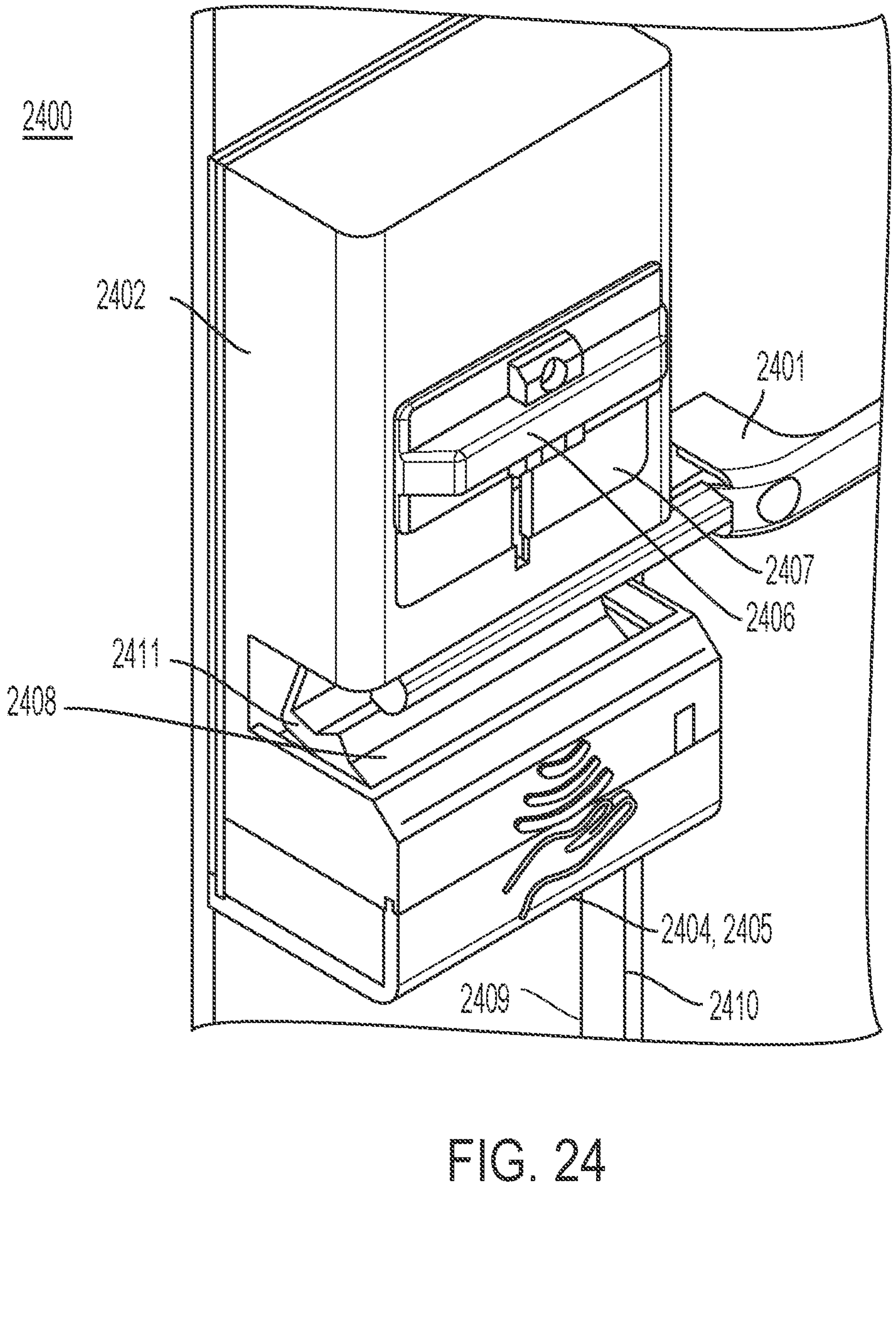
FIG. 24 depicts an exemplary locking mechanism, in accordance with various embodiments of the present disclosure.

FIG. 24 depicts an additional exemplary locking mechanism 2400 according to the present invention. In the illustrated embodiment, the locking mechanism 2400 is configured for use with an inwardly swinging door 2410. In this embodiment, the locking mechanism 2400 may include locking component 2402 which may be mounted on a door frame 2409 and a latching component 2401 may be mounted on a door 2410. Alternative configurations may mount locking component 2402 on the door 2410 and the latching component 2401 on the door frame 2409. The latching component 401 may be a bolt or other latch element that extends past the door 2410, when the latching component is mounted on the door 2410, far enough to reach an elastic component 2411 in an opening 2408 of the locking component 2402. The elastic component 2411 may contact the latching component 2401 and exert sufficient force on the latching component 2401 to hold it in the closed and unlocked position until a force is applied to move the door 2410 into the open position. In the illustrated embodiment, the elastic component 2411 extends substantially across the length of the opening 2408 of the locking component 2402. In this example, the elastic component 2411 comprises a front edge, a lip behind the front edge, and a back wall. When the latching component 2401 is pushed past the front edge and lip of the elastic component 2411, it contacts the back wall of the elastic component 2411. Pushing against the back wall of the elastic component causes the lip to be raised, which holds the latching component 2401 in place between the lip and back wall of the elastic component 2411.

A protruding element 2403 (shown in FIG. 25) of the locking component 2402 may be extended and retracted by a motor located inside the locking component 2402. In this example, the protruding element 2403 is extended downward to block the opening 2408 of the locking component

2402. When extended, the protruding element 2403 blocks the opening 2408 so that the latching element 2401 cannot be dislodged from the opening 2408 with minimal force. One or more sensors 2404, 2405 may sense user action. Sensor 2404 or 2405 may be programmed to trigger when certain parameters are met. When the sensor parameters are met, the sensor 2404 or 2405 may trigger the motor to extend or retract the protruding element 2403. Alternatively, both sensors 2404 and 2405 may trigger when certain parameters are met.

For example, a motion sensor 2404 can change the state of the locking component 2402 between locked and unlocked states via contactless manipulation. A proximity sensor 2405 may be configured to recognize when the door 2410 is in the open or closed position, similar to the function of a reed switch in a security system connected to a door that communicates when the door is opened and closed.

A tab 2406 may allow a user to manually, e.g., by physically grasping it, change the state of the locking mechanism 2400 between locked and unlocked positions by applying force to move position of a protruding element 2403. The tab 2406 may also move from one position to another when the protruding element 2403 is extended and retracted by the motor of the locking component 2402. A state display 2407 on the protruding element 2403 indicates whether the locking component 402 is locked or unlocked. Operation of the locking mechanism 2400 may be controlled by a micro-controller 300 and control circuit such as that shown in FIG. 3.

Figure 27A:
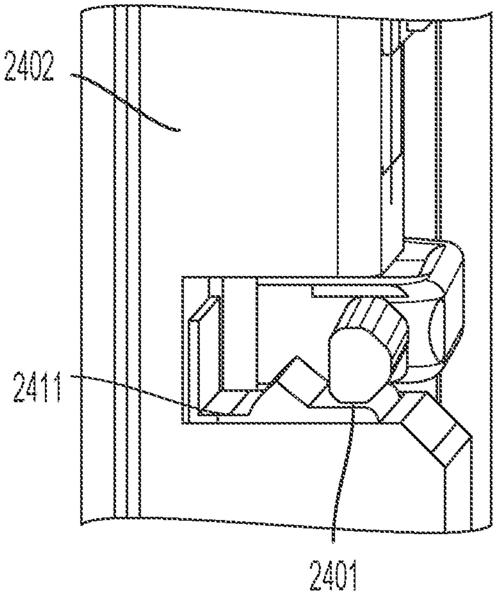
FIGS. 27A, 27B, 28A, 28B, 29A, 29B, 30A, and 30B depict movement of an elastic component of an exemplary locking mechanism as the locking mechanism transitions to an unlocked closed state, in accordance with various embodiments of the present disclosure.
Figure 27B:
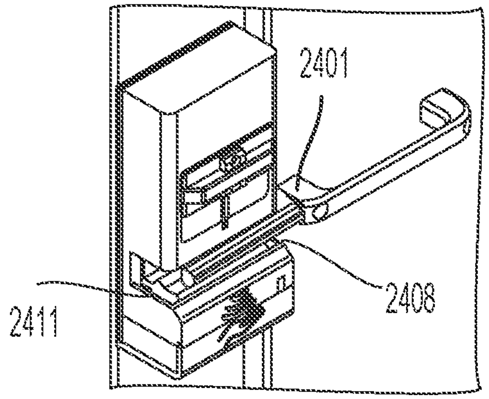

FIGS. 26A-D depict the locking mechanism 2400 as it begins to transition from a locked and closed state to an unlocked state. In the locked and closed state, the protruding element 2403 pushes down on a front edge of the elastic component 2411, which causes the latching component 22401 to remain behind the lip of the elastic component 2411. As the protruding element 2403 is retracted into the locking component 2402, it releases contact with the elastic component 2411. This causes the latching component 22401 to be moved forward of the lip of the elastic component 2411. As shown in FIGS. 27A-B, when the protruding element 2403 is fully retracted the latching component 22401 is forward of the lip of the elastic component 2411 and can freely swing out of the opening 2408.

Figure 28A:
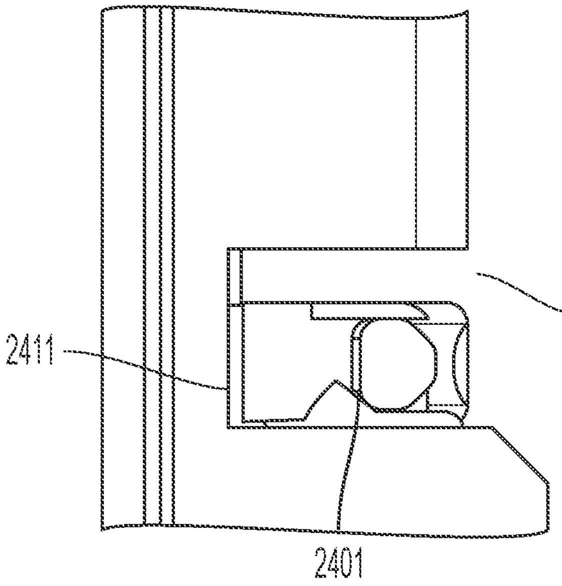
Figure 28B:
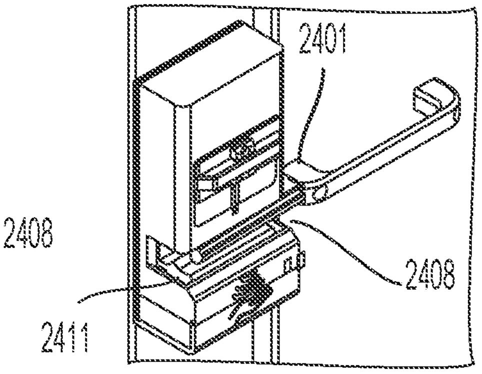
Figure 29A:
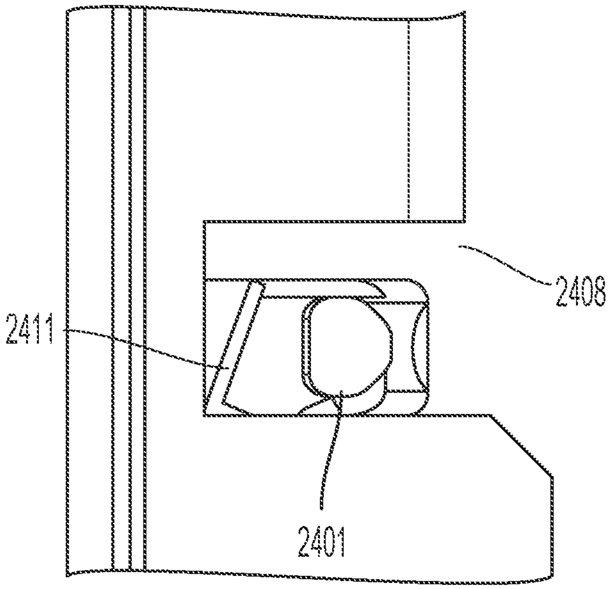
Figure 29B:
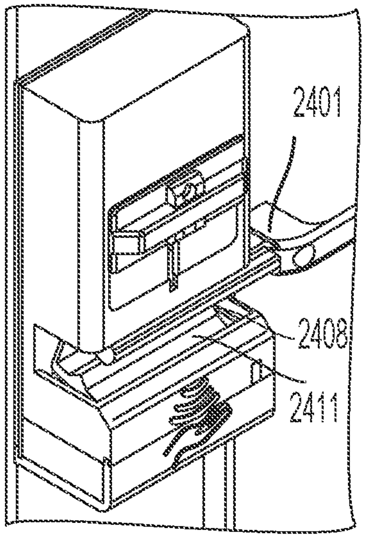
Figure 30A:
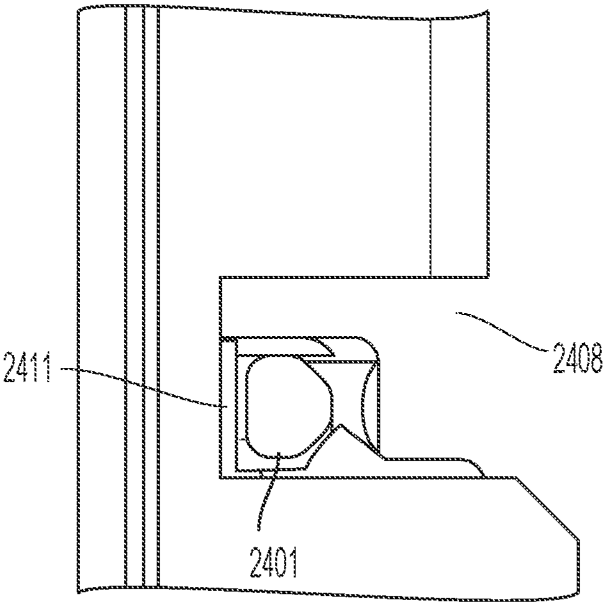
Figure 30B:
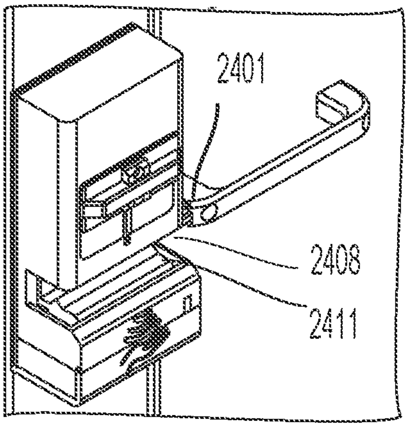

FIGS. 28(A-B)-30(A-B) show the locking mechanism 2400 as it transitions from the unlocked and open state to the unlocked and closed state. In FIGS. 28A-B, the latching element 2401 moves past the front edge and into contact with the lip of the elastic component 2411. FIGS. 29A-B show the latching component 2401 passing over the lip of the elastic component 2411. In FIG. 30A-B, the latching component 2401 has pushed against the back wall of the elastic component 2411, causing the lip of the elastic component to raise and thereby hold the latching component 2401 within the opening 2408. In this configuration, the protruding element 2403 remains retracted within the locking component 2402 and the latching component 2401 can be dislodged from the elastic component 2411 and thereby pushed out of the opening 2408 when force is applied to the door 2410.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A locking mechanism comprising:

a latching component mounted on a door frame;

a locking component mounted on a door, the locking component comprising:

a sensor;

a controller;

a protruding element comprising a spring that allows elastic movement of the protruding element; and a motor;

wherein:

in a first position, the protruding element extends without actuation from the motor from the locking component into an opening of the latching component by a first amount to hold the door in an unlocked and closed state with respect to the door frame;

the sensor senses user action and is configured to communicate sensed information to the controller; and the controller is configured to control the motor such that in a second position, the motor, responsive to receiving the sensed information, extends the protruding element from the first amount to a second amount greater than the first amount into the opening of the latching component to hold the door in a locked and closed state with respect to the door frame.

2. The locking mechanism of claim 1, further comprising a solid-state display to visually indicate whether the locking mechanism is locked or unlocked.

3. The locking mechanism of claim 1, further comprising a tab connected to the locking component and configured for manually moving the protruding element into and out of the opening of the latching component to manually lock and unlock the locking mechanism.

4. The locking mechanism of claim 1, wherein in the first position, the door is openable via an applied force causing the protruding element to retract, via compression of the spring, into the locking component, and wherein in the second position, the door is not openable via the applied force.

5. The locking mechanism of claim 1, wherein the sensor is one or more of: a break-beam sensor, an IR sensor, inductive sensor, capacitive sensor, magnetic sensor, and proximity sensor.

6. The locking mechanism of claim 1, further comprising an LED state indicator to indicate whether the locking mechanism is in a locked state or unlocked state.

7. The locking mechanism of claim 1, wherein the locking mechanism includes a communications module configured to transmit information to a device.

8. The locking mechanism of claim 7, wherein the communications module is configured to transmit information using one or more of: Wi-Fi, Bluetooth, RF, 3G, 4G, 5G, or UHB wireless technology.

9. The locking mechanism of claim 7, wherein the communications module is configured to transmit one or more of: a position of the door, a state of the locking mechanism, a battery level of the locking component, a number of locked and unlocked states, and an amount of time in the locked and unlocked states.

10. A locking mechanism comprising:

a latching component mounted on a door;

a locking component mounted on a door frame, the locking component comprising:

a protruding element comprising a spring that allows elastic movement of the protruding element;

a sensor;

a controller; and a motor;

wherein:

bringing the protruding element into contact with the latching component causes the protruding element to extend without actuation from the motor from the locking component into an opening of the latching component by a first amount to maintain the locking mechanism in an unlocked and closed state;

when the locking mechanism is in the unlocked and closed state, the sensor senses user action and communicates sensed information to the controller causing the controller to actuate the motor to extend the protruding element from the first amount to a second amount greater than the first amount into the opening of the latching component to place the locking mechanism into a locked and closed state; and when the locking mechanism is in the locked and closed state, the sensor senses further user action and communicates further sensed information to the controller, causing the controller to actuate the motor to retract the protruding element out of the opening of the latching component to place the locking mechanism into an unlocked and open state.

11. The locking mechanism of claim 10, further comprising a solid-state display to visually indicate whether the locking mechanism is locked or unlocked.

12. The locking mechanism of claim 10, further comprising a tab connected to the locking component and configured for manually moving the protruding element into and out of the opening of the latching component to manually lock and unlock the locking mechanism.

13. The locking mechanism of claim 10, wherein the sensor is one or more of: a break-beam sensor, an IR sensor, inductive sensor, capacitive sensor, magnetic sensor, and proximity sensor.

14. The locking mechanism of claim 10, wherein the locking mechanism includes a communications module configured to transmit information to a device.

15. The locking mechanism of claim 10, wherein the locking mechanism is configured to transmit information using one or more of: Wi-Fi, Bluetooth, RF, 3G, 4G, 5G, or UHB wireless technology.

16. The locking mechanism of claim 10, wherein the locking mechanism is configured to transmit one or more of: a position of the door, a state of the locking mechanism, a battery level of the locking component, a number of locked and unlocked states, and an amount of time in the locked and unlocked states.

17. A locking mechanism comprising:

a latching component mounted on a door frame;

a locking component mounted on a door, the locking component comprising:

a protruding element comprising a spring that allows elastic movement of the protruding element;

a sensor;

a controller; and a motor;

wherein;

bringing the protruding element into contact with the latching component causes the protruding element to extend without actuation from the motor from the locking component into an opening of the latching component by a first amount to maintain the locking mechanism in an unlocked and closed state;

when the locking mechanism is in the unlocked and closed state, the sensor senses user action and communicates sensed information to a controller, causing the controller to actuate the motor to extend the protruding element from the first amount to a second amount greater than the first amount into the opening of the latching component to place the locking mechanism into a locked and closed state; and when the locking mechanism is in the locked and closed state, the sensor senses further user action and communicates further sensed information to the controller, causing the controller to actuate the motor to retract the protruding element out of the opening of the latching component to place the locking mechanism into an unlocked and open state.

18. The locking mechanism of claim 17, wherein the sensor is one or more of: a break-beam sensor, an IR sensor, inductive sensor, capacitive sensor, magnetic sensor, and proximity sensor.

19. The locking mechanism of claim 17, wherein the locking mechanism includes a communications module configured to transmit information to a device.

* * * * *